United States Patent
Slough

(10) Patent No.: US 9,524,802 B2
(45) Date of Patent: Dec. 20, 2016

(54) APPARATUS AND METHODS FOR FUSION BASED POWER GENERATION AND ENGINE THRUST GENERATION

(71) Applicant: MSNW LLC, Redmond, WA (US)

(72) Inventor: John Thomas Slough, Bellevue, WA (US)

(73) Assignee: MSNW LLC, Redmond, WA (US)

( * ) Notice: Subject to any disclaimer, the term of this patent is extended or adjusted under 35 U.S.C. 154(b) by 0 days.

(21) Appl. No.: 14/750,771

(22) Filed: Jun. 25, 2015

(65) Prior Publication Data

US 2015/0364220 A1    Dec. 17, 2015

Related U.S. Application Data

(62) Division of application No. 13/670,249, filed on Nov. 6, 2012, now Pat. No. 9,082,516.

(60) Provisional application No. 61/556,657, filed on Nov. 7, 2011.

(51) Int. Cl.
*G21B 1/05* (2006.01)
*B64G 1/40* (2006.01)
*B64G 1/42* (2006.01)

(52) U.S. Cl.
CPC ............... *G21B 1/052* (2013.01); *B64G 1/408* (2013.01); *B64G 1/422* (2013.01); *Y02E 30/122* (2013.01)

(58) Field of Classification Search
CPC ........ G21B 1/052; B64G 1/408; Y02E 30/122
USPC ........................................ 376/107, 125, 318
See application file for complete search history.

(56) References Cited

U.S. PATENT DOCUMENTS

| | | | |
|---|---|---|---|
| 4,252,605 | A | 2/1981 | Schaffer |
| 4,263,095 | A | 4/1981 | Thode |
| 4,274,919 | A | 6/1981 | Jensen et al. |
| 4,314,879 | A | 2/1982 | Hartman et al. |
| 4,735,762 | A | 4/1988 | Lasche |
| 7,391,160 | B2 | 6/2008 | Monkhorst et al. |
| 7,486,758 | B1 | 2/2009 | Turchi |
| 2002/0080904 | A1 | 6/2002 | Rostoker et al. |
| 2002/0101949 | A1 | 8/2002 | Nordberg |
| 2010/0020913 | A1 | 1/2010 | Mozgovoy |
| 2011/0293056 | A1 | 12/2011 | Slough |
| 2012/0027151 | A1 | 2/2012 | Bystriskii et al. |
| 2012/0031070 | A1 | 2/2012 | Slough et al. |

FOREIGN PATENT DOCUMENTS

| | | |
|---|---|---|
| WO | 2010093981 A2 | 8/2010 |
| WO | 2012021537 A1 | 2/2012 |

OTHER PUBLICATIONS

Wurden et al, "FRCHX Magnetized Target Fusion HEDLP Experiments," IAEA 2008 Fusion Energy Conf, LA-UR-08-0796.

(Continued)

*Primary Examiner* — Jack W Keith
*Assistant Examiner* — Daniel Wasil
(74) *Attorney, Agent, or Firm* — Lowe Graham Jones PLLC

(57) ABSTRACT

Systems and methods establish a magnetically insulated fusion process. An exemplary embodiment establishes a Field Reversed Configuration (FRC) plasma, wherein the FRC plasma is a closed field, magnetically confined plasma; collapses a metal shell about the FRC plasma; and establishes a fusion reaction in response to collapsing the metal shell about the FRC plasma.

9 Claims, 13 Drawing Sheets

(56) References Cited

OTHER PUBLICATIONS

Zakharov et al, "Direct Conversion of the Energy of Laser and Fusion Plasma Clouds to Electrical Energy During Expansion in a Magnetic Field," Journal of Applied Mechanics and Technical Physics, vol. 42, No. 2, pp. 185-195, 2001.
Slough et al, "Creation of a High-Temperature Plasma Through Merging and Compression of Supersonic Field Reversed Configuration Plasmoids," Nuclear Fusion 51, Apr. 13, 2011, pp. 1-10.
Sijoy et al, "Conversion of plasma energy into electrical pulse by magnetic flux compression," Fusion Engineering and Design 86 (2011), pp. 174-182.
Intrator et al, "A High Density Field Reversed Configuration Plasma for Magnetized Target Fusion," TPSO200 Special Issue on Plenary/Invited Talks from ICOPS 2003, Feb. 2004, pp. 1-7.
Wurden et al, "FRX-L: A Plasma Injector for Magnetized Target Fusion," Physics Division Los Alamos National Laboratory, LALP-03-174, 2003.
Degnan et al, "Implosion of Solid Liner for Compression of Field Reversed Configuration," IEEE Transactions on Plasma Science, vol. 29, No. 1, Feb. 2001, pp. 93-95.
Grabowski et al, "FRC Compression Heating Experiment (FRCHX) at AFRL," IEEE, 2007.
Grabowski et al, "FRC Lifetime Studies for the Field Reversed Configuration Heating Experiment (FRCHX)," Pulsed Power Conference, IEEE, Jun. 2011, pp. 431-435.
Slough et al, "Flux Generation and Sustainment of a Field Reversed Configuration With Rotating Magnetic Field Current Drive," Physics of Plasmas, vol. 7, No. 5, May 2000, pp. 1945-1950.
Intrator et al, "Applications of predictions for FRC translation to MTF," FRC scaling xltn & comprssn, Aug. 17, 2007, pp. 1-9.
Gota et al, "A Well-Confined Field-Reversed Configuration Plasma Formed by Dynamic Merging of Two Colliding Compact Toroids in C-2," Innovative Confinement Concepts, Aug. 16, 2011.
Slough, J.: "Nuclear Propulsion Based on Inductively Driven Liner Compression of Fusion Plasmoids," Database INSPEC [Online] The Institution of Electrical Engineers, Stevenage, GB; 2011; Database accession No. 13503844; & 49th AIAA Aerospace Sciences Meeting Jan. 4-7, 2011 Orlando, FL, USA, p. 8, pp., 49th AIAA Aerospace Sciences Meeting including the New Horizons Forum and Aerospace Exposition American Institute of Aeronautics & Astronautics Reston, VA, USA Retrieved from the Internet: URL:https://s3us-west-2.
Kirtley et al: "Macron Formed Liner As a Practical Method for Enabling Magneto-Inertial Fusion," Journal of Fusion Energy, vol. 29, No. 6, Dec. 2010 (Dec. 2010), pp. 561-566, USA, ISSN:0164-0313, DOI: 10.10071510894-01 0/9314-y; XP2701539.
Votroubek et al: "The Plasma Liner Compression Experiment," Journal of Fusion Energy, vol. 29, No. 6, Dec. 2010 (Dec. 2010) pp. 571-576, USA ISSN: 0164-0313, DOI: 10.1007/s10894-01O-9335-6; XP2701540.
Slough et al: "Pulsed Plasmoid Propulsion: The ELF Thruster," Proceedings of the International Electric Propulsion Conference; 31 st International Electric Propulsion Conference; University of Michigan, USA, vol. 31st Jan. 1, 2009, pp. 1-24, XP008147097, Retrieved from the Internet: URL: http://erps.spacegrant.org/uploads/images/imagesliepc_articledownload_1988-2007/2009index/1 EPC-2009-265.pdf.

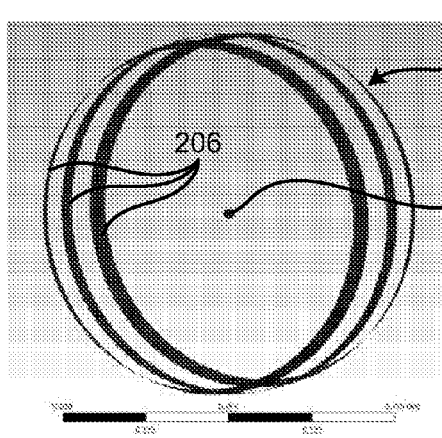 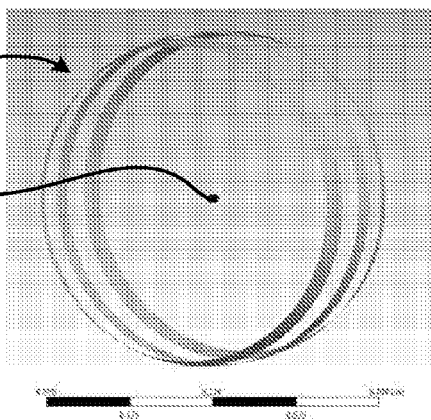
FIG. 2A    FIG. 2B
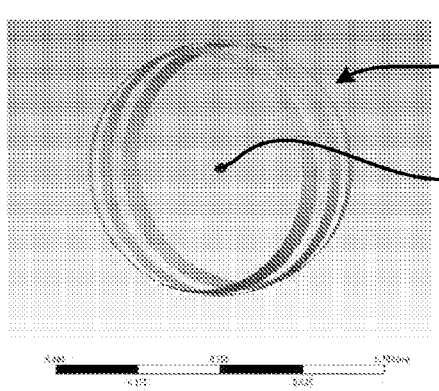 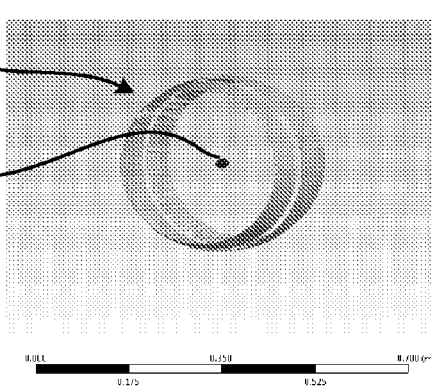
FIG. 2C    FIG. 2D
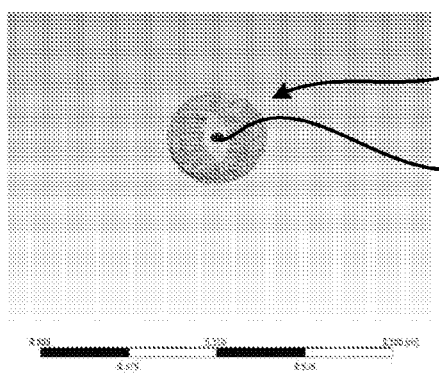 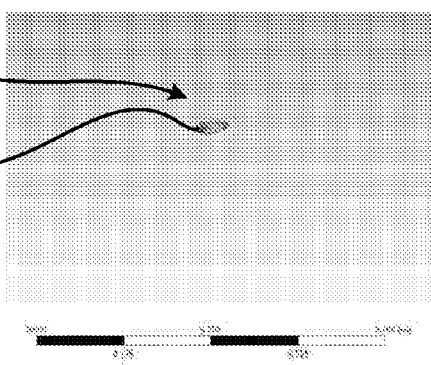
FIG. 2E    FIG. 2F

| Element | Current Intgrl. | Ratio to Al | $v_{max}/\delta$ (m/s) | Ratio to Al |
|---|---|---|---|---|
| Ag | 1.53E+17 | 1.51 | 9.19E+06 | 0.39 |
| Al | 1.01E+17 | 1.00 | 2.37E+07 | 1.00 |
| Al (6061) | 1.07E+17 | 1.05 | 2.49E+07 | 1.05 |
| Au | 1.39E+17 | 1.37 | 4.53E+06 | 0.19 |
| Be | 9.24E+16 | 0.91 | 3.15E+07 | 1.33 |
| Cu | 2.33E+17 | 2.30 | 1.64E+07 | 0.69 |
| Li | 1.36E+16 | 0.13 | 1.61E+07 | 0.68 |
| Na | 1.19E+16 | 0.12 | 7.70E+06 | 0.33 |
| Pb | 5.79E+15 | 0.06 | 3.21E+05 | 0.01 |
| Mg | 2.20E+16 | 0.22 | 7.95E+06 | 0.34 |

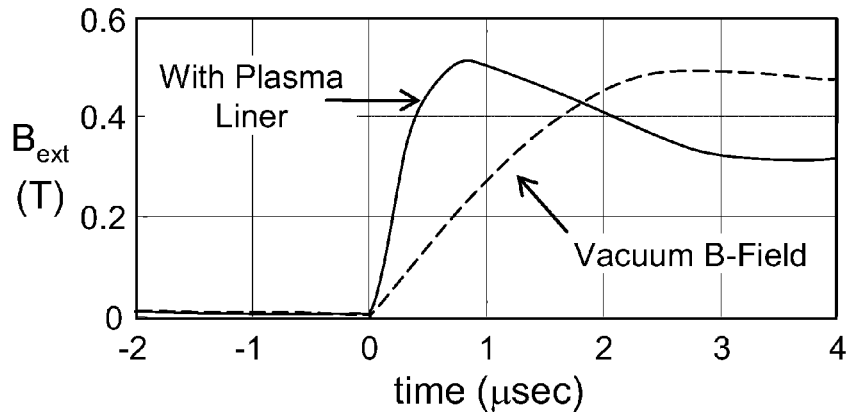

FIG. 5

Adiabatic Law:   $P \sim V^{-5/3}$
Rad. P Balance:  $P \sim nkT \sim B_e^2$
Particle Cons:   $nV = \text{const.}$
FRC φ Cons:     $\varphi \sim r_c^2 B_e$ (const $x_s$)

$\Rightarrow$ $T \sim B_e^{4/5}$
$n \sim B_e^{6/5}$
$r_s^2 l_s \sim B_e^{-6/5}$
$l_s \sim r_s^{2/5}$

| Parameter | Merged FRC ($t = \tau_{1/4}$) | Radial FRC Compression | Axial FRC Compression |
|---|---|---|---|
| $v_L$ (km/s) | 2.5 | ~ 0 | 0 |
| $r_L$ (cm) | 22.5 | 0.9 | 0.9 |
| $r_s$ (cm) | 20 | 0.8 | 0.88 |
| $l_s$ (cm) | 80 | 22 | 3.5 |
| $B_{ext}$ (T) | 0.16 | 100 | 410 |
| $T_e + T_i$ (keV) | 0.06 | 5 | 15 |
| $n$ (m$^{-3}$) | $1.1 \times 10^{21}$ | $2.5 \times 10^{24}$ | $1.4 \times 10^{25}$ |
| $E_p$ (kJ) | 2.2 | 180 | 560 |
| $E$ (Pa) | $1.5 \times 10^4$ | $6 \times 10^9$ | $10^{11}$ |
| $\tau_N$ (μs) | 600 | 175 | 270 |

FIG. 6

APPARATUS AND METHODS FOR FUSION BASED POWER GENERATION AND ENGINE THRUST GENERATION

PRIORITY CLAIM

This patent application is a Divisional of U.S. application Ser. No. 13/670,249, filed Nov. 6, 2012, published as U.S. Publication No. 2014/0023170, and entitled "APPARATUS, SYSTEMS AND METHODS FOR FUSION BASED POWER GENERATION AND ENGINE THRUST GENERATION," which is a provisional of U.S. provisional application entitled "Inductively Driven, 3D Liner Compression of a Magnetized Plasma to Megabar Energy Densities," having application Ser. No. 61/556,657, filed Nov. 7, 2011, both of which are incorporated herein by reference in their entirety.

BACKGROUND

Traditional chemical-based propulsion systems may be used to launch and maneuver space vehicles. Once aloft, an additional amount of chemicals, or fuel, is required to provide thrust. Further, additional fuel may be required to generate electrical power. However, such chemical-based propulsion systems are inherently limited by the amount of fuel that is transported into space along with the vehicle. At some point during the operating life of the space vehicle, the fuel will become depleted and will thus render the space vehicle unusable.

Further, generation of electrical power, both for space and terrestrial applications, is becoming increasingly important. Accordingly, there is a need in the arts to provide a more efficient and effective propulsion system for space vehicles and/or for electrical power generation for both space and terrestrial applications.

SUMMARY

Systems and methods of establishing a magnetically insulated fusion process are disclosed. An exemplary embodiment establishes a Field Reversed Configuration (FRC) plasma, wherein the FRC plasma is a closed field, magnetically confined plasma; collapses a metal shell about the FRC plasma; and establishes a fusion reaction in response to collapsing the metal shell about the FRC plasma.

In another embodiment, magnetic insulation fusion system comprises a fusion containment chamber, a metal shell that initially resides about an outer periphery of an interior region of the fusion containment chamber, a driver coil disposed around an outside of the fusion containment chamber, and an established Field Reversed Configuration (FRC) plasma, wherein the FRC plasma is a closed field, magnetically confined plasma. Upon energization of the driver coil, a generated magnetic field inductively collapses the metal shell about the FRC plasma to compress the FRC plasma to fusion conditions.

BRIEF DESCRIPTION OF THE DRAWINGS

The patent or patent application file contains at least one drawing executed in color. Copies of this patent or patent application publication with color drawings will be provided by the Office upon request and payment of the necessary fee.

Preferred and alternative embodiments are described in detail below with reference to the following drawings:

FIGS. 2a-2f are conceptual diagrams illustrating compression of a liner about a target plasma area;

FIG. 5 illustrates maximum velocity for various foil liner materials;

FIG. 6 states key adiabatic relations for the target FRC plasma;

FIG. 13, bottom sequence, are end-on images for a 6 cm radius aluminum foil;

DETAILED DESCRIPTION

Figure 1A:
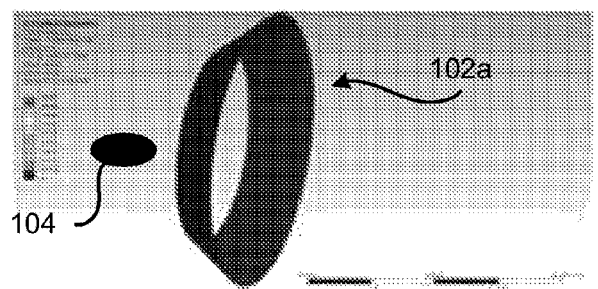
FIGS. 1a-1e are conceptual diagrams showing an internal region of an example embodiment of a magnetic insulation fusion system.

Embodiments of the magnetic insulation fusion system 100 provide thermal insulation with a magnetic field formed to facilitate magnetic fusion energy (MFE), and more particularly, formed to provide a magnetic field for containment of inertial fusion energy resulting from collapse of a shell about Field Reversed Configuration (FRC) plasma.

In the Magnetized High Energy Density (MHED) plasma regime, the plasma pressure is typically as large, or larger than, the magnetic pressure. Also, the role of collisions is much stronger than in MFE. The advantages provided by magnetic insulation is that fusion gain can be achieved with lower input energy and power.

In the various embodiments, magnetic fields are introduced about a target FRC plasma material by electrifying a plurality of coils which establish the magnetic fields. The FRC plasma is a closed field, magnetically confined plasma that has demonstrated the configuration lifetime scaling required for the type of shell, or foil liner, compression. In the various embodiments, it is important to have sufficient plasma confinement in order to retain plasma energy and inventory during the time required for the shell to reach peak compression. The compression from the generation of the magnetic fields results in flux compression. Flux compression facilitates formation of an electrically conducting FRC plasma. At some point, the FRC plasma enters into a state of fusion, referred to herein as magneto-inertial fusion (MIF).

By employing metal shells for compression (interchangeably referred to as collapsing) about the FRC plasma, it is possible to produce the desired convergent motion inductively by inserting the metal shells, such as sheets or the like, along the inner surface of cylindrical or conically tapered coils. Both stand-off and energy efficiency issues are solved by this arrangement. In the various embodiments, the metal shell can be positioned a meter or more from the target FRC plasma implosion site with the driver coil both physically and electrically isolated from the shell. The driver efficiency can be quite high as the coil driver is typically the inductive element of a simple oscillating circuit where resistive circuit losses are a small fraction of the energy transferred. With an in-line element as rudimentary as a diode array, any magnetic energy not imparted to the liner can be recovered back into the charging system after the shell is driven off with the first half cycle.

Spaced-based fusion demands a much lower mass system. The lowest mass system by which fusion can be achieved, and the one to be employed here, is based on the very compact, high energy density regime of magnetized fusion employing a compact toroidal Field Reversed Configuration (FRC) plasma, interchangeably referred to as a FRC plasmoid. Fusion conditions are achieved at high energy density by applying the kinetic energy of a significantly more massive metal shell, such as the example foil liners 206, to compress the target FRC plasma to high density and temperature. The energy density of the fusion plasma system considered here is intermediate between the typical magnetic fusion energy regime of the tokamak and inertial confinement fusion (ICF). In this regime, efficient power conversion can be obtained at low cost with minimum mass and energy. The achievement of fusion gain in this regime draws from the strengths of both ICF and MFE in that it generates a high yield with minimal confinement hardware, but where the presence of the magnetic field in the target FRC plasma suppresses the thermal transport to the confining shell, thus lowering the imploding power needed to compress the target to fusion conditions. Unlike MFE, the confinement time is not determined by the energy confinement of the magnetized plasma, but instead by the shell's dwell time at maximum compression which is determined by its inertia. This area of fusion research has thus been termed Magneto-Inertial Fusion (or MIF).

The various embodiments' fusion process starts by employing an inductively driven metal shell first to compress the magnetized FRC plasma. The metal shell is inductively driven by a magnetic field formed by energizing (injecting current into) a driver coil. As the radial and axial compression proceeds, this shell thickens to form a fusion blanket that absorbs virtually all the fusion energy as well as the radiated plasma energy during the brief fusion burn time. This superheated blanket material is subsequently ionized and now rapidly expands inside a divergent magnetic field that converts both blanket plasma and fusion plasma energy into propulsive thrust and electrical energy. The latter is accomplished from the back emf experienced by the conical magnetic field coil circuit via flux compression.

Embodiments of the magnetic insulation fusion system 100 obtain the MHED plasma state required for fusion by inducing a rapid flux compression of a preexisting magnetized FRC plasma. The rapid flux compression, in the various embodiments, can be driven by an imploding metal liner, converging plasma jets, or other means. An energetically efficient method of producing a MHED plasma at megabar energy densities is by the three dimensional (3D) implosion of a metal shell onto a high beta target FRC plasma. Accordingly, a very large compression ratio is achieved by employing several thin foil liners, initially at large radius, that are inductively driven both radially and axially inward to converge at small radius.

FIGS. 1a-1e are conceptual diagrams showing an internal region of an example embodiment of a magnetic insulation fusion system 100. Fusion is induced by a collapsing a metal shell 102, interchangeably referred to as a liner, onto the target FRC plasma 104. The FRC plasma 104 is being moved from the left towards the right during the collapsing of the metal shell 102. The internal region resides in a fusion containment chamber with the metal shell 102 initially disposed adjacent to an outer periphery of an interior region of the fusion containment chamber.

Figure 1B:
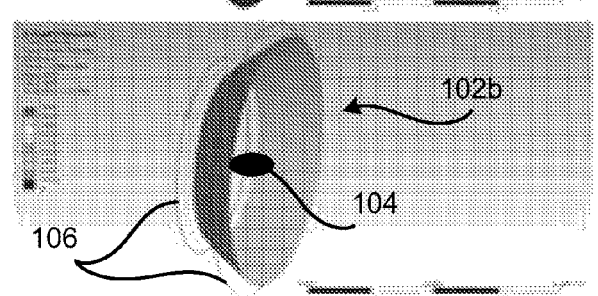
Figure 1C:
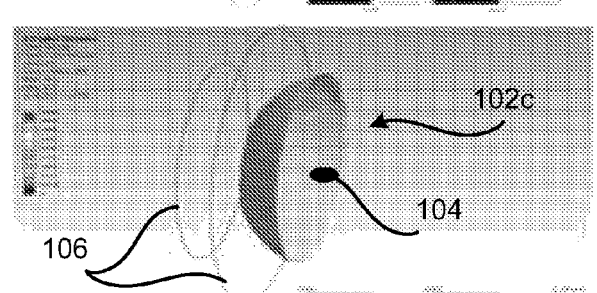
Figure 1D:
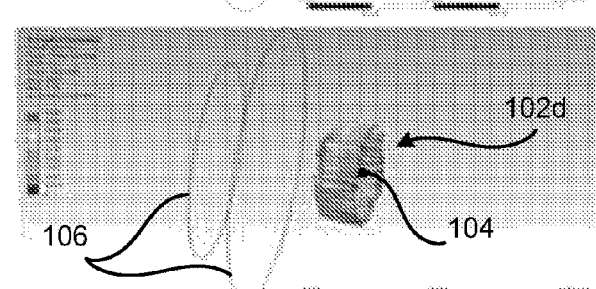
Figure 1E:
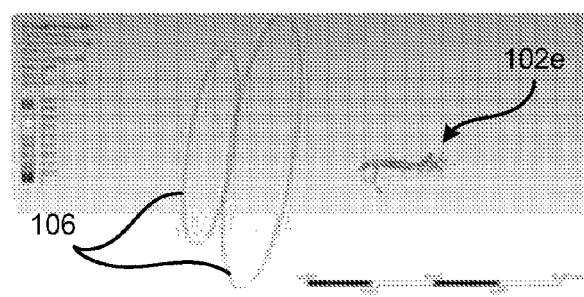

FIG. 1a conceptually illustrates the metal shell 102a in an initial position. FIG. 1b conceptually illustrates the metal shell 102b beginning to become collapsed by a magnetic field. The circular lines 106 indicate the original location of the metal shell 102a (see FIG. 1a). As time progresses, the metal shell 102b continues to collapse, as illustrated in FIG. 1c. Additionally, the collapsing metal shell 102c has been moved forward (moving from its initial position shown in FIG. 1a towards the right) so as to converge on the moving FRC plasma 104. FIG. 1d illustrates the metal shell 102d becoming nearly collapsed about the FRC plasma 104. When the collapsing metal shell 102 encloses a FRC plasma 104, fusion begins to occur. FIG. 1e conceptually illustrates the remnant metal shell 102e vaporized and ionized with the FRC plasma 104.

FIGS. 2a-2f are conceptual diagrams illustrating compression of a liner 202 about a target area 204. FIGS. 2a-2f illustrate the example liner 202 as a plurality of foil liners 206 oriented and positioned around the example target area 204. In the illustrated embodiment, three foil liners 206 are employed. Alternatively, other numbers of foil liners 206 may be used. In an example embodiment, each of the foil liners are comprised of a strip of metal arranged in a hoop (interchangeably referred to as a ring), wherein the hoop is defined by a width, a thickness, and a radius. The foil liners 206 are initially disposed adjacent to an outer periphery of an interior region of the fusion containment chamber.

FIG. 2a illustrates the foil liners 206 in an initial position and orientation about the target area 204. As the magnetic field is established and begins to exert force on the foil liners 206, the foil liners 206 begin to collapse, as conceptually illustrated in FIGS. 2b-2e. FIG. 2f illustrates the foil liners 206 collapsed about the target area 204.

In the various embodiments, a Field Reversed Configuration (FRC) is well suited for providing the target FRC plasma, interchangeably referred to herein as a FRC plasmoid, for compression. When the FRC plasma is located in the target area 204, the collapsing foil liners 206 compress the FRC plasma, thereby initiating the fusion process.

The magnetic insulation fusion system 100 facilitates confinement scaling at the size and density that is required to assure sufficient plasma retention of the target FRC plasma throughout the compression duration required for liner convergence. The FRC plasma naturally has a high beta (plasma/magnetic pressure ratio) equilibrium and contracts axially with compression thereby considerably simplifying technological requirements for the 3D compression. When the target FRC plasma is generated by FRC merging, the FRC plasma can be readily formed inside, or formed and then moved to be inside, the converging foil liners 206 at the appropriate scale by a plurality of remote FRC generation coils. The target FRC plasma provides for the largest possible compression ratio without exceeding optimal plasma temperatures at maximum compression ($T_i \sim T_e \leq 15$ keV). The target FRC plasma that will be located at the target area 204 inside the foil liners 206, in an example embodiment, is generated by merging at least two FRC plasmoids. Other embodiments may merge more FRC plasmoids.

In addition, the FRC plasma must be of sufficient size to assure sufficient lifetime to survive the compression timescale required for liner-based inertial fusion. In addition, the FRC plasma must be formed with enough internal flux to satisfy the BR ignition criteria at peak compression. At a nominal liner converging speed of 3 km/s, a 0.2 m radius FRC, in an example embodiment, would be fully compressed in 67 μs which is only a fraction of the lifetime that was observed for these FRCs (~1 ms). These FRC plasmoids also had more than sufficient internal flux to satisfy the magnetic ignition criterion at full compression.

Following is a short analysis of some of the energy and structural requirements for the liner compression experiment depicted schematically in FIGS. 2a-2e to achieve megabar energy densities inside the foil liners 206. It is useful at this point to consider certain constraints imposed by available equipment, time, cost, and a desire to limit collateral damage to experimental hardware after achieving the high energy density plasma (HEDP) state with the foil liners 206. The last consideration is addressed by limiting the foil liner kinetic energy to less than a megajoule, and providing sufficient standoff and/or protection for critical elements such as the vacuum chamber wall, driver coils, power supplies, etc. In an example embodiment, a fused silica vacuum chamber is employed. In one embodiment, ten of the 0.84 m diameter, 1.25 m long, and 1-2 cm thick cylindrical tubes are employed, though any suitable number of tubes and/or tube dimensions may be used. A single tube would be of sufficient length for two liner chambers when divided. There is very little liner material "blow back" to the wall after liner implosion even with a much smaller radius chamber (0.12 m diameter). Accordingly, significant damage to the tubes does not occur. In applications with such a large stockpile of replacement tubes, some wear and tear with occasional tube replacement would be tolerable in any case. An opaque fused quartz or other silica tube material is particularly robust, where the quality of the tubes is further enhanced by providing an inner lining of pure translucent quartz glass on the inner wall for much lower impurity levels.

In the various embodiments, an adequate pulse power energy is required to reach megabar pressures. In an example embodiment, a fast capacitor bank energy (±25 kV) provides up to 1.75 MJ. In other embodiments, electrical power may be provided by other sources, such as, but not limited to, batteries or generators.

For the implosion of the foil liners 206, the fast capacitor bank may be configured to operate at 80% of the maximum, or 1.4 MJ. The coupling efficiency for inductively driven foil liners 206 may be limited to about 30%. This potential limitation in some embodiments is primarily due to the difficulty in coupling energy into the very small coils employed ($r_c < 7$ cm), as well as the limited time for liner acceleration at small radius. Both of these issues are considerably ameliorated by a much larger scale system to be employed in alternative embodiments. In an example embodiment, a plurality of driver coils will be 0.42 m in radius, and will be energized by a massively paralleled array of fast capacitor bank modules so that stray inductance will be less than 5% that of the vacuum coil inductance. With the larger size and the increase in coil to stray inductance ratio provided by such alternative embodiments, it is possible to achieve energy coupling efficiencies of up to 50%. In an example embodiment, for the present zero order analysis it will assumed to be 40% for a total kinetic energy of 560 kJ for all three foil liners 206 as depicted in FIG. 3.

In an example embodiment, there is rapidly diminishing liner acceleration after the foil liners 206 have moved in roughly 20% of the coil radius. An example of the radial implosion of a 1 cm wide by 14 cm diameter foil liner is shown in FIG. 3, which illustrates the dynamics of liner compression. The X axis (X) denotes the ratio of liner radius to the initial radius.

Figures 3, 4:
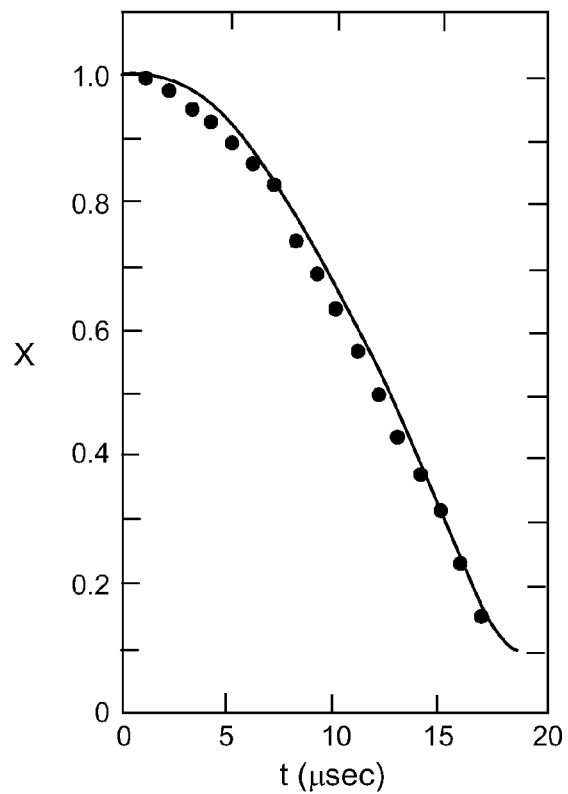
FIG. 3 illustrates the dynamics of liner compression.
FIG. 4 illustrates characteristics of candidate liner materials.

FIG. 3 illustrates the dynamics of liner compression. The implosion illustrated in FIG. 3 is due to the drop-off in magnetic force as the foil liner moves away from the coil which limits the effective radial distance over which it is possible to efficiently maintain significant magnetic pressure. Another distinct advantage of a large initial liner radius used by larger embodiments is that the time available to accelerate the foil liners 206 to a given velocity increases with coil radius. Accordingly, a significantly lower axial magnetic field can thus be employed to achieve the same final foil liner velocity. With the foil liner's increased circumferential length, the total mass accelerated by the same axial field coil is increased as is the liner kinetic energy.

The foil liners 206 move inward both radially and axially, and converge stagnating against a rising plasma pressure of the target FRC plasma. Ignoring compressive effects within the foil liners 206, it is appreciated that the liner kinetic energy transferred to the plasma energy may be described by Equation (1).

$$E_p = 3/2(N_i k T_{i0} + N_e k T_{e0}) = 1/2 M_L v_{max}^2 = 560 \text{ kJ} \quad (1)$$

In Equation (1), the subscript 0 denotes the value at peak compression. $N_{i(e)}$ is the total ion (electron) inventory, $M_L$ is the total liner mass, $v_{max}$ is the maximum liner velocity, and $E_p$ is the plasma energy. It will be assumed that $N = N_i = N_e$ and that $T = T_i = T_e$ at maximum compression.

It will be assumed that the target FRC plasma has the proper initial conditions, and that it will be adiabatically compressed to a volume small enough to achieve one megabar energy density. For an elongated ellipsoidally shaped plasmoid ($l_s = 4 r_s$), and with the plasmoid energy density $E (= 10^{11}$ Pa), plasma volume and dimensions may be described by Equation (2).

$$Vol = \frac{8}{3} \pi r_s^3 = \frac{E_p}{E} = 5.6 \times 10^{-6} m^{-3} \Rightarrow r_s = 0.87 \text{ cm}, l_s = 3.5 \text{ cm} \quad (2)$$

In view of Equations (1) and (2), an appropriate inventory for an optimal D-T fusion system may be defined by setting $T_e = T_i = 15$ keV. From Equation (1), the D+T inventory, $N_{DT} = 7.8 \times 10^{19}$, and from Equation (2), the peak plasma density $n_0 = 1.4 \times 10^{25}$ m$^{-3}$ are defined.

In an example embodiment, in order to "cover" the target plasma as well as provide some margin for the collapsed liner thickness, each of the foil liners 206 will be 4-5 cm in axial extent. FRC equilibrium provides for adequate plasmoid axial contraction during flux and foil liner (wall) compression to remain confined axially inside the outer liner rings. To achieve a full 3D compression, it is sufficient to assure that one or more of the foil liners 206 have a launch angle so as to converge onto the central foil liner 206, thereby providing the extra factor of 3-4 in axial compression from what the FRC equilibrium length would be from radial compression alone. In an example embodiment, the three foil liners 206 are all five centimeters (5 cm) in axial extent at an initial radius of roughly forty centimeters (40 cm). Any suitable axial extent and/or initial radius may be used.

As illustrated by FIGS. 2a-2f, the behavior of the foil liners 206 with compression may be analyzed employing a suitable 3D analysis code. For simplicity, the magnetic field pressure is simulated by specifying a surface pressure with the same axial and temporal behavior expected from the magnetic field pressures generated by the coils. When simulation was performed using the foil liner dimensions, material and coil magnetic waveforms, the liner dynamics were accurately reproduced all the way through implosion and even later. This is possible due to the ability of the suitable code to follow material deformation well beyond the linear limit.

FIG. 4 illustrates characteristics of candidate liner materials. The choice of the foil liner metal for implosion is important, particularly if it is to be used for fusion applications. A foil liner material's electrical and thermal properties determine the liner's minimum thickness (mass) for a given liner velocity (energy) when driven by the inductive technique in order to avoid vaporization of the foil liner. The foil liner material properties relating to this resistive heating (electrical conductivity, melting point, heat capacity, etc.) can be characterized by a parameter $g_M$ defined by the "current integral" as shown in Equation (3).

$$\int_0^{t_m} I^2 dt = g_M A^2 \qquad (3)$$

In Equation (3), I is the current flowing through the material cross-sectional area, $A = w \times \delta$, where w is the hoop width and $\delta$ is the hoop thickness of the foil liners 206. The driving force is simply the magnetic pressure ($B^2/2\mu_0$) applied over the surface area of the metal shell facing the coil when in close proximity to the driving coil. The current can be related to the force through Ampere's law which can be reasonably approximated as $B = \mu_0 I/w$. Normalizing to the action constant, $g_{Al}$ for the vaporization of aluminum from an initial temperature of 300° K., one finds for the maximum velocity for a given shell thickness $\delta$ in accordance with Equitation (4).

$$v_m = 2.5 \times 10^7 \frac{g_M}{g_{Al}} \frac{\rho_{Al}}{\rho_M} \delta \text{ (m/s)} \qquad (4)$$

In Equation (4), $\rho_M$ is the shell material density. This is usually not a significant issue during FRC plasma compression due to the formation of a thick blanket at convergence, but the initial thickness should typically be much greater than needed for the characteristic velocities (2-4 km/s) anticipated. FIG. 5 illustrates maximum velocity for various foil liner materials. From FIG. 5, it can be seen that there are potentially several metals that could be employed for the foil liners 206. Not surprisingly, aluminum is a strong contender. It has a maximum velocity for a given liner thickness that is second only to beryllium, which would be a rather exotic, expensive, and difficult material to be employed, but could be valuable in a fusion context for assuring a high breeding ratio. The relatively strong dependence on conductivity also favors a good conductor such as aluminum. A lithium shell would be especially advantageous in that the initial thin shell could be readily extruded for positioning under the coil between pulses. Besides having a low yield strength, lithium also has several other advantages as a liner material. Recall that the ultimate fate of the imploded liner in the presence of significant fusion gain is vaporization and ionization after intense fusion neutron, alpha and radiative heating. Lithium is to be favored for its breeding potential, high vaporization temperature and very low ionization energy. How these attributes can be taken advantage of in the fusion context will be discussed later.

In an example embodiment, the choice for the foil liners 206 is aluminum. Aluminum is inexpensive, safe and easy to handle. Aluminum has good vacuum properties. For the stated liner kinetic energy, the aluminum liner mass, and thus thickness, can be specified once the characteristic liner velocity is determined.

With the use of a thin liner at large radius there is a hidden benefit in that a significant buffer field is provided from flux leakage through the liner during the initial stages of acceleration. This external field, $B_{ext}$, then diffuses into the cylinder with a characteristic diffusion time given by Equation (5).

$$\tau = 1/2 \mu_0 r_L \delta \sigma_L \qquad (5)$$

In Equation (5), $r_L$ is the initial (inner) cylinder radius, and $\sigma_L$ is its electrical conductivity. The diffusion of the field is governed by the Equation (6).

$$\tau \frac{dB_{in}}{dt} = B_{ext} - B_{in} \qquad (6)$$

The dynamics of the liner implosion are then governed by Equation (7), where $M_L$ is the liner mass, and w the liner width.

$$M_L \frac{d^2 r}{dt^2} = \left( \frac{B_{in}^2}{2\mu_0} - \frac{B_{ext}^2}{2\mu_0} \right) 2\pi r w \qquad (7)$$

With the initiation of the θ-pinch current, the field rises rapidly in the small radial gap between the external coil and the foil liners 206 as the liners acts to shunt virtually all of the coil inductance. A large driving field is rapidly developed. In an example embodiment with a close fitting driver coil, the plasma sheath formation at the inner vacuum wall eliminated most of the coil inductance and caused a much more rapid rise in the current as only the stray inductances of the external circuit (cables, switches, and coil-sheath gap) provide the only significant impedance to current flow. The rapid current rise was readily detected by the external magnetic probes positioned radially between the coil and the vacuum tube wall as shown in FIG. 5, which illustrates the magnetic field at the compression section midplane measured between the theta pinch coil and the vacuum wall with and without a xenon plasma liner. The drop in field after liner lift-off (~1 μsec in FIG. 5) below that of the vacuum field is a reflection of the energy transfer to the liner which was over 50%.

Equation (5) demonstrates that during the liner acceleration, very little flux leaks through the liner ($B_{in} \ll B_{ext}$), and with the greater inertia of a solid metal liner, the magnetic field maintains a roughly constant amplitude ($B_{ext}$~const.) during this time with the increase in flux in the gap countered by the increasing gap cross-sectional area. With this assumption, Equation (7) is now readily integrated. With the liner mass $M_L = 2\pi r_L w \delta \rho_{Al}$ where $\delta$ is the liner thickness and $\rho_{Al}$ the density of Aluminum, the liner velocity is defined by Equation (8).

$$v_L = \left(\frac{r(t)}{2\mu_0 r_L \delta \rho_{Al}}\right) B_{ext}^2 t = 125 \frac{\tau_{1/4}}{\delta} B_{ext}^2 \qquad (8)$$

In Equation (8), the approximation is made that the foil liner is accelerated at roughly constant field up to the time when the foil liner has moved inward to $r=0.85\ r_L$. From a circuit efficiency point of view, this should occur at the point of maximum energy transfer into the driver coil. This will occur at the quarter cycle time $\tau_{1/4}$ of the driver circuit, and when the capacitor bank is typically crowbarred to preserve the flux in the driver coil. Thus the effective drive time $t \sim \tau_{1/4}$ and is determined by the bank capacitance and coil inductance at this time i.e. $L_c(\tau_{1/4}) \sim 0.7\ L_{vac}$, with $\tau_{1/4} \sim \pi/2(L_c C)^{1/2} \sim 40$ μsec. At this time, $\Delta r = 0.15 r_L = 6$ cm also reflects the radial range over which $B_{ext}$ remains roughly constant. For this to be true, the flux must be increasing up to this time to a value equal to $\pi r_L^2 (1-0.85^2) B_{ext}$. This determines $B_{ext}$ as the magnetic field energy cannot be greater than stored energy minus the anticipated liner energy which is (1.4-0.56) MJ~0.8 MJ for the capacitor bank. Equating this to the magnetic energy stored in the annuli of the three foil liners 206 yields a magnetic field $B_{ext}=9$ T in the gap when the liner has moved inward by 15% of the initial coil (liner) radius of 0.4 m. While the foil liner continues to be accelerated, the rate drops dramatically as the area between the coil and foil liner grows but the capacitor bank energy has been fully transferred to the coil. For the foil liner to have moved inward 6 cm in 40 μsec under a constant magnetic force implies a terminal velocity of $v_L=3$ km/s. This is consistent with Equation (8) which predicts a velocity of 3.3 km/s for a 9 T accelerating field.

Given the nominal liner kinetic energy of 560 kJ the total liner mass can now be determined with $M_L=125$ g. Assuming three, 5 cm wide Aluminum foil liners implies a liner thickness $\delta=0.12$ mm. From Equation (4) the maximum velocity for Aluminum liner of this thickness is 3.1 km/s. This liner thickness is a bit too marginal as effects such as increased resistivity and heating with increasing liner temperature has not been fully included. A lower terminal velocity ($v=2.5$ km/s) with a more massive ($M_L=180$ g) and thicker ($\delta=0.18$ mm) liner will be employed for a better margin ($v_m=4.4$ km/s). It is a somewhat less optimal coupling to the driver circuit, but given the level of approximation employed here, the match is adequate. This terminal velocity is also fairly typical for the flux driven liners that have achieved magnetic field compressions up to 600 T (1.4 megabar).

It should be noted that while the drive field may be high, it is transient and well below the yield strength of common structural materials including high strength Aluminum. This is in stark contrast with smaller flux driven embodiments where the field strength required to drive the liner is closer to 100 T and the drive coil is typically destroyed in the process. It should also be noted that the voltage needed to produce the required field in the gap in the appropriate time is given by Equation (9).

$$V = \omega AB = \frac{\pi}{2\tau_{1/4}} \pi r_L^2 (0.28) B_{ext} = 48\ \text{kV} \qquad (9)$$

Equation (9) is a good match to the 50 kV (±25 kV) bank at the foil liner compression (FLC) facility or device.

During target FRC plasma formation and compression, the initial plasma parameters are key to obtaining the optimal compressed plasma target. For inertial fusion in example embodiments, past Magneto-Inertial Fusion (MIF) designs have considered three target plasmas for MIF: the FRC, the Z-pinch and the spheromak. A closed field line plasma that has intrinsically high beta, and can be readily compressed as the primary target plasma for MIF is preferred. Of the three target plasma approaches, only the target FRC plasma has the linear geometry, high plasma β, and closed field confinement desired for magnetic compression to high energy density. Most importantly, the target FRC plasma has demonstrated the configuration lifetime scaling required for the type of liner compression envisioned here. In an example embodiment, it is critical to have sufficient plasma confinement in order to retain plasma energy and inventory during the travel time required for the liner to reach peak compression. Even for the fastest implosion speeds achieved (~3-5 mm/μs), the time to maximum compression is several times the axial ion transit time. The target FRC plasma also has the distinct feature that even with liner capable of only a radial compression, the target FRC plasma undergoes an axial contraction as well due to the internal field line tension within the target FRC plasma, with the net result being effectively a 2.4D compression of the target FRC plasma.

In the various embodiments, the target FRC plasma can be generated over a wide range of sizes, temperatures and densities, and then translated into the foil liner for compression. Injecting two target FRC plasma bodies and merging them inside the foil liner considerably shortens the time for compression as this process can be delayed until the foil liners have been fully accelerated and have moved inward away from the driver coils. The proper plasma parameters for the merged target FRC plasma bodies are best found by extrapolation back from the desired final state. The compression that is applied by the foil liners is adiabatic with regard to the target FRC plasma as the foil liner motion is far less than the plasma sound speed. FIG. 6 states key adiabatic relations for the target FRC plasma. The relationships illustrate target FRC plasma adiabatic scaling laws, and anticipated target FRC plasma parameters from merging a purely radial, and a purely axial compression. In practice, the FRC radial and axial compressions would occur together.

The behavior and parameter scaling of the target FRC plasma under a 3D compression may be conceptually described by dividing the process into two steps, as is done in FIG. 6. First, it is assumed that the target FRC plasma is compressed only radially as it is in the usual Z-pinch liner approach. The first column reflects the target parameters of the target FRC plasma after the two source target FRC plasma bodies have been merged into the liner compression chamber. FIG. 3 illustrates that a time of insertion of ~100 μsec would be well after the liners have reached maximum inward velocity so that the target FRC plasma residence time within the liners is considerably shortened. With $v_L$~2.5 km/sec (0.25 cm/µsec) the time to full compression is roughly another 100 µsec from this point.

In the various embodiments, target FRC plasma confinement scaling is employed to assure adequate target inventory. In the first FRC-based embodiments, the FRC particle confinement was observed to scale roughly as $\tau \sim r^2/\rho_i$, where $\rho_i$ is the ion Larmour radius at the FRC separatrix. Since the target FRC plasma has primarily only a poloidal magnetic field, the plasma pressure at the null must equal the radial pressure exerted by the external field in equilibrium, as described by Equation (10).

$$B_e^2 = 2\mu_0 n_0 k(T_i + T_e) \tag{10}$$

In Equation (10), the zero subscript refers to the value at the magnetic null radius R ($=r_s/\sqrt{2}$). With $T_i \sim T_e$ one has $1/\rho_i \sim n^{1/2}$ inferring that the diffusion coefficient for the target FRC plasma is independent of radial scale and has only a positive scaling with density. Later results indicate further dependences with the target FRC plasma elongation, $\epsilon$, and the ratio of target FRC plasma separatrix radius, $r_s$ to coil radius $r_c$, with this ratio designated as $x_s$. The observed particle confinement, stated in terms of directly measured quantities that can be accurately measured across all experiments, yields the following scaling in accordance with Equation (11).

$$\tau_N = 3.2 \times 10^{-15} \epsilon^{1/2} x_s^2 r_s^{2.1} n^{0.6} \tag{11}$$

Merged target FRC plasma bodies exhibit improved confinement over this scaling. But, as can be seen in FIG. 6 for the various FRC plasma states, the target FRC plasma confinement should be more than adequate without any enhancement. This is true particularly for the compressed state. The liner stagnation (dwell) time for the foil liner under consideration is given roughly by the time it would take the foil liner to reach the axis and back unimpeded, as shown by Equation (12).

$$\tau_D \sim \frac{2r_0}{v_L} \sim 7 \, \mu\text{sec} \tag{12}$$

The dwell time is thus far less than the predicted target FRC plasma particle confinement time. It is in fact similar to the Bohm time so that confinement can be much worse than expected and not be a serious issue. Even if the plasma diffuses to the liner wall, it has been shown that the thermal transport in such a high field region would be insignificant even for a cold boundary and a plasma β greater than unity.

Figure 7:
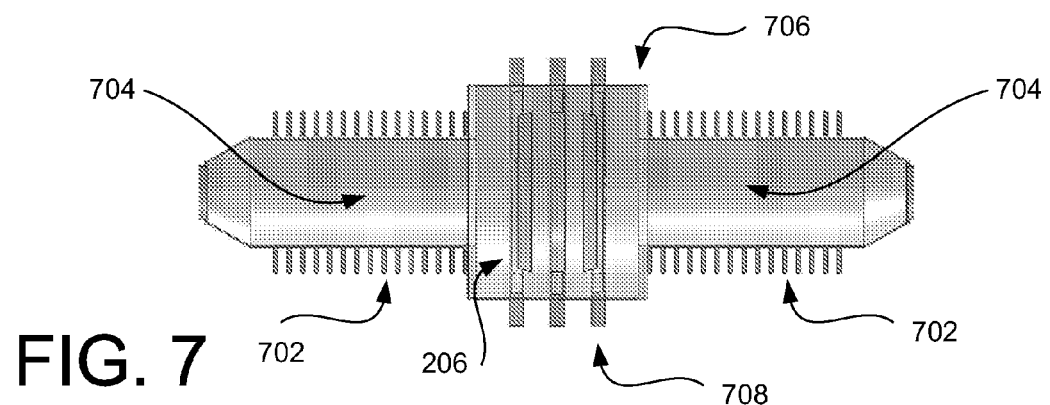
FIG. 7 illustrates an example embodiment of the magnetic insulation fusion system 100 that is configured for fusion of two Field Reversed Configuration (FRC) target plasma bodies.

FIG. 7 illustrates an example embodiment of the magnetic insulation fusion system 100 that is configured for fusion of two target FRC plasmoids. In the various embodiments, injecting the two FRC plasmoids is delayed to until the shell or foil liners have been fully accelerated and have moved inward away from the driver coils. Injecting the two FRC plasmoids and merging them inside the shell or foil permits axially stationary compression of the shell or foil liners, which considerably simplifies the compression process as the target FRC plasma remains fixed.

The 2D resistive code Moqui was used to calculate the behavior of the target FRC plasma bodies merging in example embodiment depicted in FIG. 7. A plurality of FRC formation coils 702 are oriented about two chambers 704 (interchangeable referred to as a plasma containment chamber) on either side of the chamber 706 (interchangeable referred to as a fusion containment chamber) that has the foil liners 206 therein. The foil liners 206 are inductively driven to converge radially and axially (to form a thick blanket surrounding the target FRC plasma and compress the FRC plasma to fusion conditions) by a magnetic field formed by energizing (injecting current into) the driver coil 708. That is, the magnetic field established by injecting current into the driver coils 708 compress the foil liners 206. A target FRC plasma body (not shown) is generated and compressed in each of the chambers 704, and then are moved into the chamber 706 for merging. In an example embodiment, the chambers 704, 706 are fused silica vacuum chambers.

Figure 8:
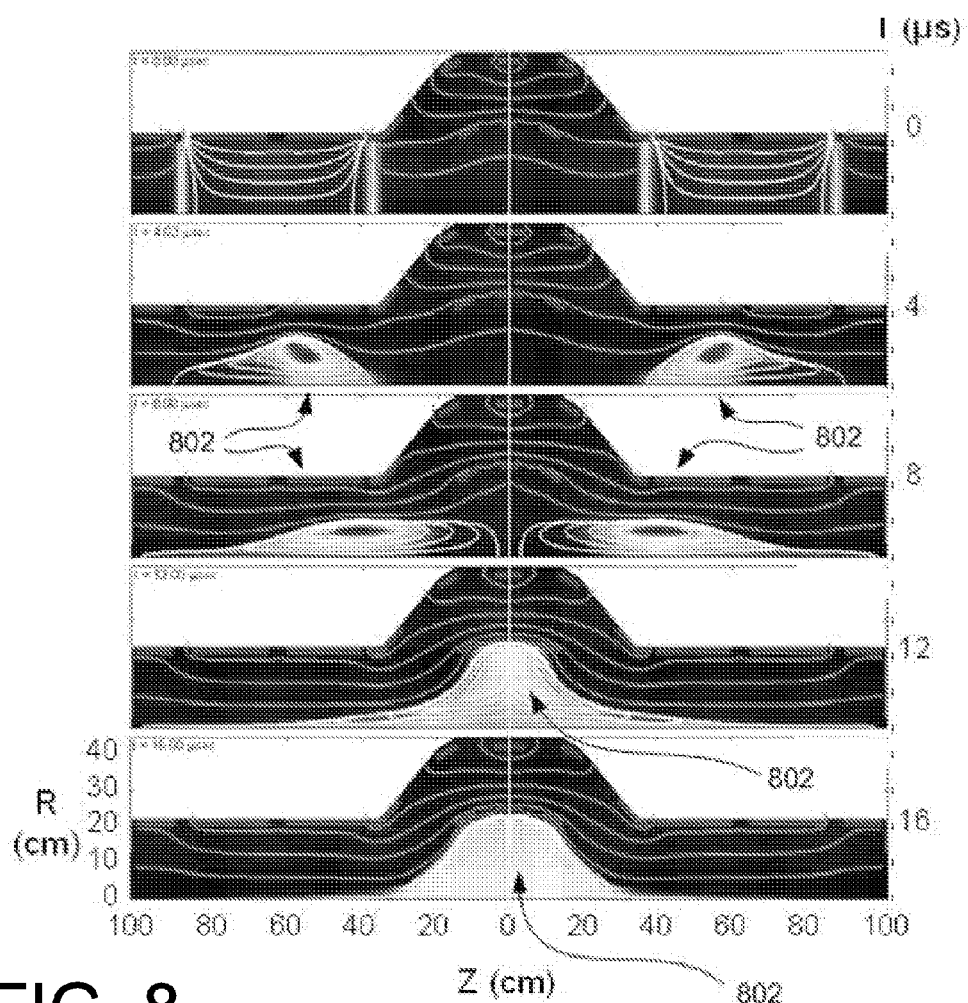
FIG. 8 conceptually shows formation and the subsequent merging of the target FRC plasma bodies.

FIG. 8 conceptually shows formation and the subsequent merging of the target FRC plasma bodies 802. Since the timescale for formation and insertion (~12 µsec) is relatively rapid compared to the motion of the foil liners 206 during this time (~3 cm), the fixed nature of the coils in the calculation is an acceptable approximation. The target FRC plasma bodies 802 are formed in a respective fusion containment chamber. The established FRC plasma bodies 802 are moved from the plasma containment chamber into a central region of an adjacent fusion containment chamber disposed between the two plasma containment chambers. The two FRC plasma bodies 802 are merged in the fusion containment chamber for the fusion process.

It should be noted that at t=0, the flux from the driver coils 708 is confined radially outside the metal bands, although the driver field at this time has dropped off to the point where it would have only a small influence on the liner behavior. As can be seen in FIG. 8, the leakage flux through the metal bands provides for the magnetic cushion between the target FRC plasma and liners. The magnitude both inside the liners and external to the liners can be adjusted over a wide range by delaying the crowbar timing of the driver coils 708 appropriately, or if found necessary, by employing additional coils that are energized after the liners have been accelerated. Having a somewhat higher field outside the liners radially is useful as it keeps the target FRC plasma bodies confined radially in between the liners and axially at the end of the liners, as illustrated in FIG. 8.

Figure 9:
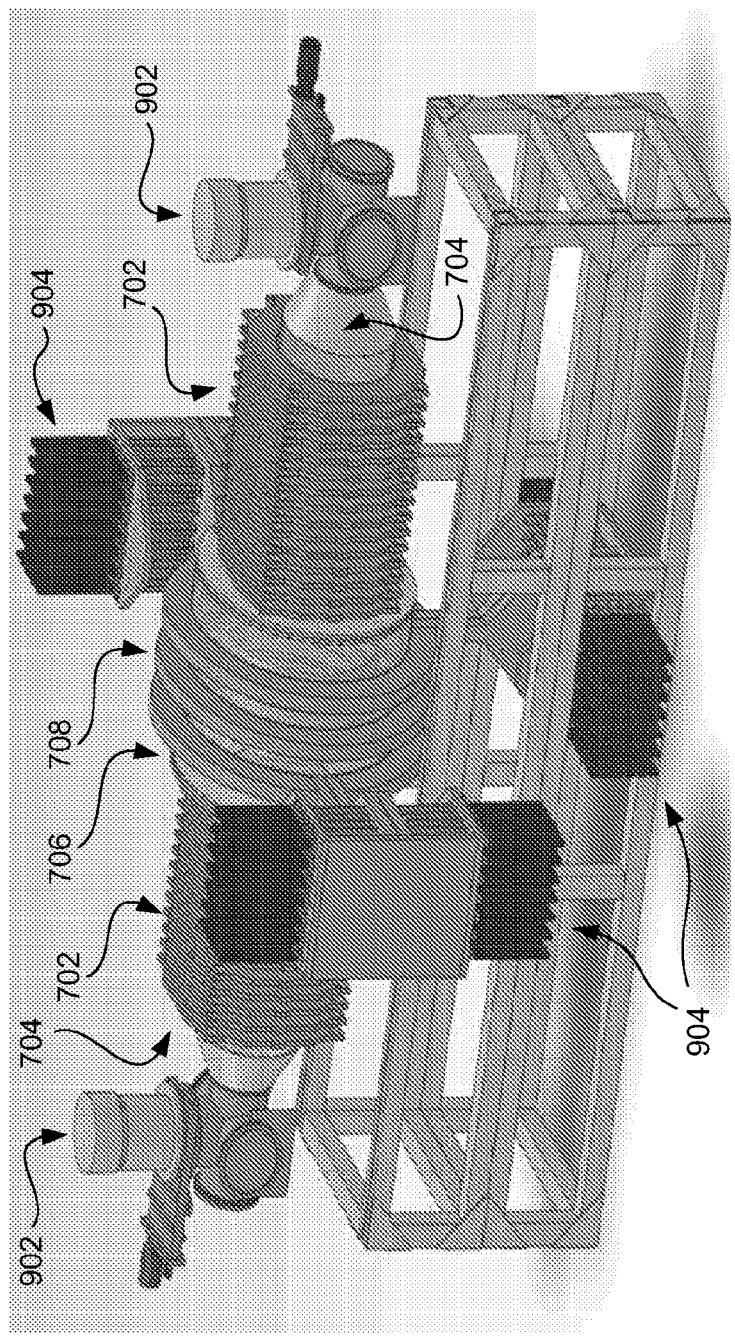
FIG. 9 illustrates in greater detail an embodiment of the magnetic insulation fusion system 100 of FIG. 7.

FIG. 9 illustrates in greater detail an embodiment of the magnetic insulation fusion system 100 of FIG. 7. Turbo pumps 902 are disposed at the distal ends of the chamber 702 to provide a means for injecting a gas from which the target FRC plasma bodies are formed therefrom. Collector and feedplate units 904 coupled to the driver coils 708 to apply current and to receive electrical power. The metal liners are collapsed by energizing the driver coils 708.

Figure 10:
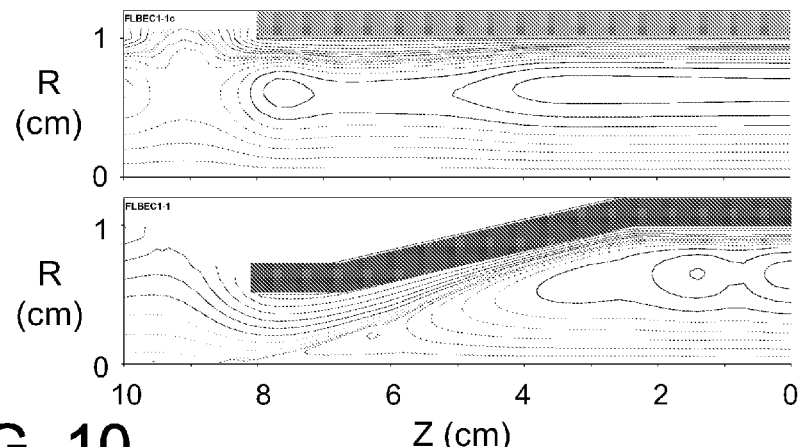
FIG. 10 illustrates the change in flux profile that accompanies the 3D compression of the target FRC plasma.
Figure 11:
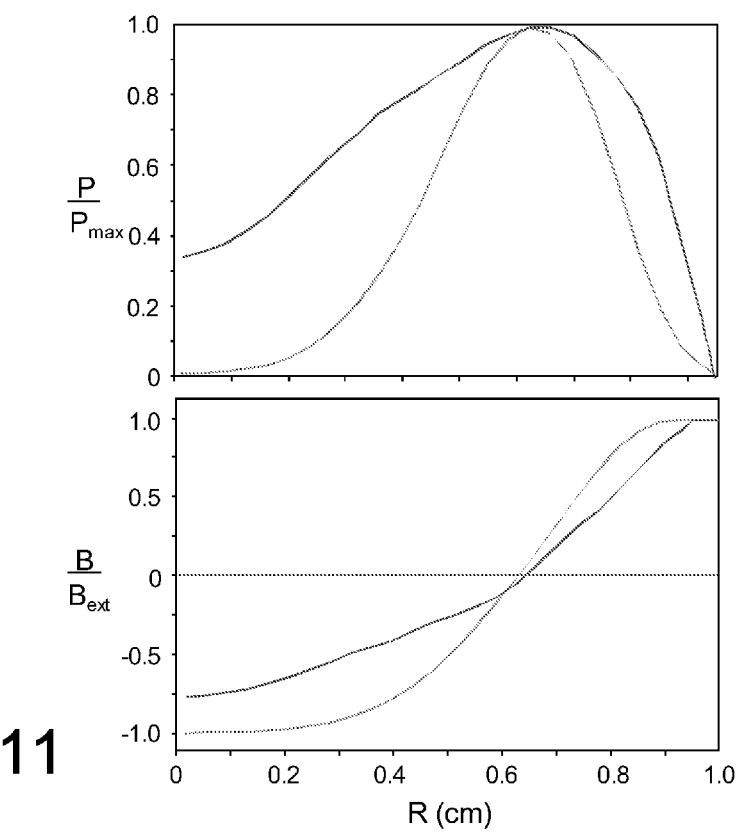
FIG. 11 illustrates the profile changes with axial compression for the change in flux conserver shape depicted in FIG. 10.

Adjusting the flux between the plasma and liner wall is important for fusion applications as will be seen in the next section. It provides for a greater or less magnetic insulation of the FRC plasma as it is axially compressed beyond what its equilibrium length would be in a constant radius flux conserver. FIG. 10 illustrates the change in flux profile that accompanies the 3D compression of the target FRC plasma. The axial compression increases the plasma β by causing the FRC plasma pressure profile to become flatter about the null, pushing the flux toward the axis and wall, and increasing the magnetic field strength in the process. FIG. 11 illustrates the profile changes with axial compression for the change in flux conserver shape depicted in FIG. 10. In FIG. 10, the top image illustrates the cylindrical liner (green) with elongated FRC plasma at the scale of the fully compressed target FRC plasma bodies. In FIG. 10, the bottom image illustrates the compressing of the ends of liner (red) radially and axially inward. Profile changes are shown in FIG. 11. In FIG. 11, the top image illustrates the radial plasma pressure normalized to the peak at the FRC plasma null. In FIG. 11, the bottom image illustrates the axial magnetic field normalized to the value at the liner wall. The ends of the merged liners are observed to do this naturally, as the end liners have a significant axial velocity component and are unimpeded by the FRC presence as it contracts axially inward. The unique behavior of the FRC plasma equilibrium to axial liner compression is quite valuable in this context as it provides for magnetic insulation of the FRC boundary regardless of the increase in the ratio of plasma to magnetic energy that comes with the increased axial compression.

In accordance with Equation (13), the Lawson triple product for the 15 keV plasma is:

$$n\tau T_f \sim (1.4 \times 10^{25})(7 \times 10^{-6})(15) = 1.5 \times 10^{21} \text{ keV-m}^{-3}\text{-s} \quad (13)$$

In Equation (13), the value of T was assumed to be the liner dwell time, $T_D$, given in Equation (12). As the anticipated triple product is greater than that required for breakeven, it warrants a discussion as to how such a system might be employed to generate electrical power. The method for achieving the compressional heating required to reach fusion gain conditions based on the compression of a target FRC plasmoid has been described. By employing an inductive technique to accelerate an array of thin, metal bands, the foil liners 206 are accelerated radially inward to create a three dimensional compression of the target FRC plasma. Accordingly, several issues concerning driver efficiency and stand-off are greatly mitigated. Having the target FRC plasma formed remotely in the separate chambers 702 aids greatly in isolation and protection for the FRC formation hardware as well. Guiding the target FRC plasma bodies into the proper position by the action of the ambient liner and driver magnetic fields facilitates easy target assembly. The metal bands can be located a meter or more from the target implosion site, and with inductive drive, the driver coils 708 are physically positioned outside the reactor vacuum wall. The speed and direction of the bands (foil liners 206) for the desired convergent motion are controlled by appropriately shaped flux concentrators inside the vacuum vessel.

A key aspect for fusion is the creation of an effective fusion blanket that is formed with liner convergence. The merging foil liners 206 form a several centimeter thick blanket that surrounds the target FRC plasma at peak compression. This blanket absorbs a large fraction of the fusion neutron energy as well as virtually all of 1) the radiated plasma energy during the fusion burn, 2) the escaped fusion alphas, and 3) the fusion heated FRC energy remaining on disassembly. Essentially all of the energy input, and a vast majority of the fusion energy output, ends up as heat in the post fusion liner material. If the gain is sufficient, the energy released will vaporize and ionize the foil liner material. This plasma would also have considerable thermal energy. The expansion of the liner plasma cloud in the presence of the axial magnetic field that fills the chamber does work in compression of this field. Direct energy conversion into electricity can thereby be obtained, and it can be accomplished at high efficiency ($\eta \sim 85\%$) as the compression/expansion ratio will be quite large. The fusion cycle could thus be highly efficient, yet operate at relatively low energy yield. These aspects, together with magnetic insulation and stand-off, would drastically reduce wall damage thereby making repetitive operation feasible.

The feasibility of rapidly accelerating inward and compressing thin hoops of aluminum and/or copper inductively is used by various embodiments to obtain very high magnetic fields. Even though there is essentially no magnetic field within the liners initially, there is enough leakage flux during the inward acceleration that at peak compression the magnetic field that is trapped inside the now thickened metal wall can reach as high as 600 T. This field is more than that required for compression of the target FRC plasma to have substantial fusion gain.

Follows is an analysis of the conditions required for fusion gain for IDLC fusion utilizing target FRC plasma. For this analysis, cylindrical symmetry will be assumed with the primary confining field being the axial magnetic field (a prolate FRC). For the FRC plasma in this geometry, the plasma pressure is equal to the external magnetic field pressure. It will also be assumed that the plasma density is adjusted so that at maximum compression the plasma temperature is in the range of 10 to 20 keV. It will be assumed that it is a D-T plasma. It will also be assumed that the inner shell boundary, and thus the FRC plasma, is ellipsoidal with elongation $\epsilon$, is incompressible and that the total radial and axial implosion kinetic energy $E_k$, is transferred into compression of the target FRC plasma and magnetic field with negligible losses. The energy within the FRC separatrix at peak compression is dominated by plasma energy that is in pressure balance with the edge magnetic field $B_0$, as defined by Equation (14).

$$E_k = \frac{1}{2} M_L v_L^2 = 3 n_0 k T_0 \cdot \frac{4}{3} \pi r_0^3 \epsilon = \frac{B_0^2}{\mu_0} \pi r_0^3 \epsilon \quad (14)$$

In Equation (14), $M_L$ is the total liner mass and the zero subscript indicates values at peak compression. The last expression in Equation (14) further reflects the reasonable assumption that $r_s \sim r_0$ and magnetic pressure balance (see Equation (10)). The fusion energy produced in the FRC plasma during the shell's dwell time $T_D$ at peak compression is in accordance with Equation (15).

$$E_{fus} \cong 1.2 \times 10^{-12} n_0^2 \langle \sigma v \rangle \frac{4}{3} \pi r_0^3 \epsilon \tau_D = 1.1 \times 10^{-42} n_0^2 T_0^2 \frac{r_0^4}{v_L} \epsilon \quad (15)$$

In Equation (15), $n_0$ and $T_0$ are the peak density and temperature, and where the liner shell dwell time at peak compression, $T_D$, was given by Equation (12). The usual approximation for the D-T fusion cross section in this temperature range: $\langle \sigma v \rangle \cong 1.1 \times 10^{-31} T^2(\text{eV})$ was also assumed. Pressure balance (Equation (10)), together with the expressions of Equation (14) and Equation (15), yields the fusion gain, as noted in Equation (16), where $l_0$ ($=2 r_0 \cdot \epsilon$) is the length of the FRC plasma at peak compression.

$$G = \frac{E_{fus}}{E_L} = 1.73 \times 10^{-3} \sqrt{\frac{M_L}{l_0}} B_0 = 4.3 \times 10^{-8} \sqrt{M_L} E_L^{11/8} \quad (16)$$

Recall that at one megabar energy density the corresponding edge magnetic field was 410 T (see FIG. 6). The FRC plasma length was 35 mm and the total liner mass was 0.18 kg for a gain, G=1.6. From this expression, a higher gain margin can be obtained by increasing the liner mass. If the same liner velocity is maintained, the liner energy would increase, thereby increasing $B_0$ and decreasing the FRC plasma length. Better standoff would be achieved by increasing the scale of coil driver by a factor of 2.5 (i.e. a one meter radius liner). The foil liner mass would also increase by this factor if one were to maintain the same foil liner velocity and width. Recall that a thicker foil liner would be necessary if this parameter is increased as well. A more gentle acceleration of the foil liner is preferred as the choice of foil liner material would most likely change to lithium, which is structurally more malleable than aluminum or beryllium. Lithium has other advantages that will be discussed hereinafter. Compressing the same FRC plasma with 2.5 times the liner kinetic energy would increase the FRC plasma energy by the same factor. From Equation (14), using the adiabatic scaling laws (see FIG. 6), results in Equation (17).

$$E_k \sim B_0^2 r_0^2 I_0 \sim B_0^{4/5} \text{ and } I_0 \sim r_0^{2/5} \sim B_0^{-1/5} \tag{17}$$

Accordingly, the gain enhancement would be $(2.5)^{1/2} \cdot (E_k^{9/8}) = 4.43$, for a total gain $G=7.1$. ($E_k$ may interchangeably referred to as $E_L$.) The total gain is determined by the energy requirements to vaporize, ionize and energize the metal liner propellant. It is useful then to rewrite Equation (16) in terms of the fusion energy produced per unit liner mass, as shown in Equation (18).

$$\frac{E_{fus}}{M_L} = G\left(\frac{E_L}{M_L}\right) = 4.3 \times 10^{-8} M_L^{15/8} v_L^{4.75} \tag{18}$$

This is sufficient that the conditions for ignition need to be considered. Fuel magnetization allows a significant reduction of the "ρR" ignition threshold when the condition B·R>60 T-cm is fulfilled. This condition can be readily met for the target FRC plasma conditions anticipated even for the proposed experiment (R=$r_0$~1 cm, B~$0.2B_0$~80 T). Additional flux can be introduced inside the foil liner by adding the appropriate bias field after foil liner acceleration, so that the magnetization condition can always be met at the expense of decreased reacting plasma volume.

Figure 12:
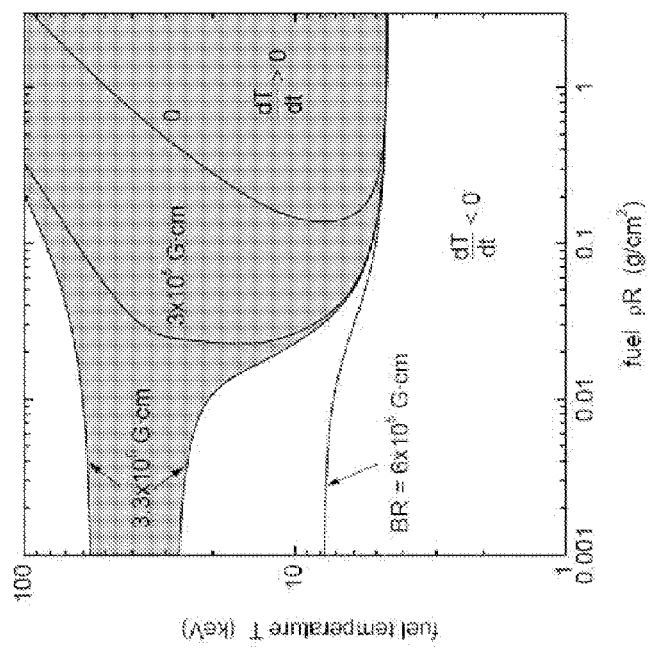
FIG. 12 illustrates the BR form of the Lindl-Widner diagram.

The modification to the usual ICF region for ignition (dT/dt>0) due to the presence of magnetic fields is found in FIG. 12. FIG. 12 illustrates the BR form of the Lindl-Widner diagram: along each ignition curve the product BR is kept constant at the corresponding marked value. When the BR parameter exceeds the threshold value, the dT/dt>0 region extends to infinitely small ρR and ignition becomes possible at any ρR.

The modification of the ignition criteria for ICF comes about primarily due to the magnetization and confinement of the fusion alphas. Having a large buffer field near the wall to deflect alphas predominately generated in the relatively field-free FRC plasma core creates an ideal configuration minimizing alpha losses as well as eliminating synchrotron radiation.

In an example embodiment, a better liner material from the fusion breeding point of view would be lithium or beryllium. Lithium, being softer with a relatively low melting point, would be much easier to implement as it could be injection molded onto the surface under the driver coils, flowed or even sprayed to form the liner between discharges. To achieve the same liner mass as aluminum the lithium liner thickness must be increased by the ratio of their densities, i.e. (2700 kg/m³)/(530 kg/m³)=5.1. From Equation (4), it can be seen with this increase in thickness and reduction in density that the ultimate liner velocity increases significantly to 15.2 km/s due to the slower acceleration made possible at larger radius. Increasing the liner velocity is thus another knob by which the gain could be increased with no significant technical issues.

Figure 13:
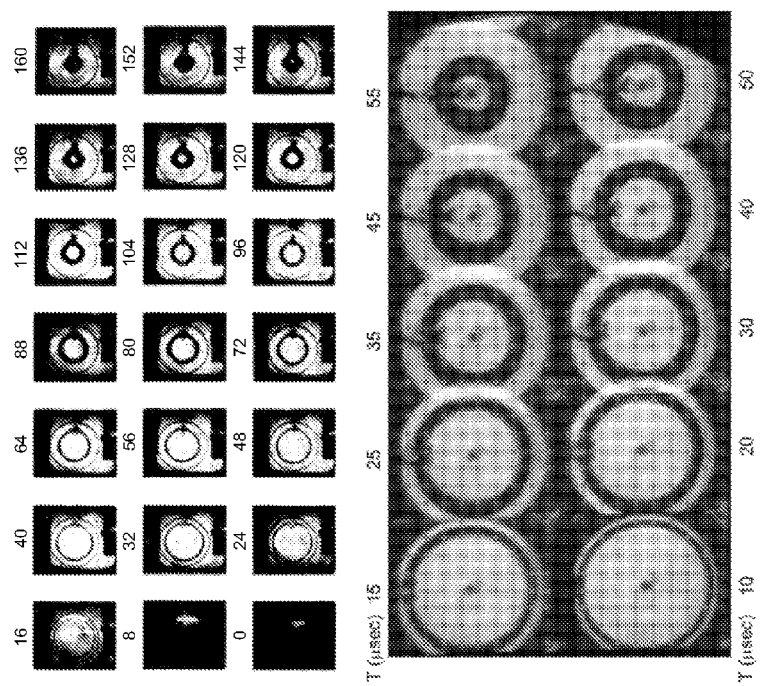
FIG. 13, top sequence, are end-on framing camera pictures from ref. 10 for a 7 cm radius copper foil liner.

The compression ratio to be achieved in an example embodiment is $C_{FRC}$=20/0.88~22.7 from FIG. 6. This would increase somewhat with the increased liner radius considered for the IDLC fusion reactor as the plasma volume $\sim M_L^{-3/2} \Rightarrow r \sim M_L^{1/2}$, and $C_{FRC}$~36 for the larger liner radius. A potential concern may be the behavior of the liner at a larger compression ratio. The ratio of the liner thickness to radius would actually decrease for lithium due to the much thicker liner. Based on modeling, as well as the liner experiments, there is a characteristic tendency for the foil liners to eventually buckle as the internal stresses within the foil liner build with decreasing radius (see FIG. 2). The fact that foil liners have successfully compressed magnetic fields to very high values indicates that the buckling is at such a scale as to not significantly affect the compression. End-on imaging of the foil liners show increasing thickness as the foil liner converges (see FIG. 13), but with no evidence of buckling FIG. 13, top sequence, are end-on framing camera pictures from ref. 10 for a 7 cm radius copper foil liner. FIG. 13, bottom sequence, are end-on images for a 6 cm radius aluminum foil. The modeling calculations have a buckling scale length of a factor 100 to 200 times smaller than the circumference so that it may not be observed experimentally in either the x-ray or visible pictures as the foil liners are also in motion.

In an example embodiment, it was decided not to leave the potential buckling to underlying imperfections or lack of azimuthal symmetry when it would be only slightly more effort to form the foil liners with preset bends, interchangeably referred to herein as pleats.

Figure 14:
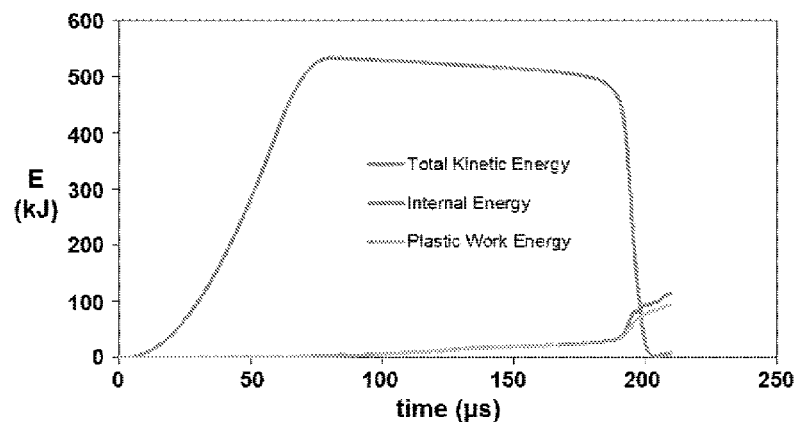
FIG. 14 illustrates the resulting energies from the fusion of the target FRC plasma.

Pleating is readily accomplished as the large foil liners are thin, even for lithium (δ~1 mm). This "pleating" would assure a symmetric folding as the foil liners converge radially inward. The depth of the pleat can be defined so that the fold depth is on the order of the final foil liner thickness minimizing the amount of liner deformation that must occur in compression. The increase in both the internal energy from compression as well as plastic deformation during the terminal compression is calculated for the three liner compression shown in FIG. 2. FIG. 14 illustrates the resulting energies from the fusion of the target FRC plasma. It can be seen that a significant part of the liner kinetic energy is diverted into these loss channels. The pleated foil liner should significantly reduce these losses. The design is also guided by the desire to have the inner fold come into strong contact just prior to minimum impact radius.

Figure 15:
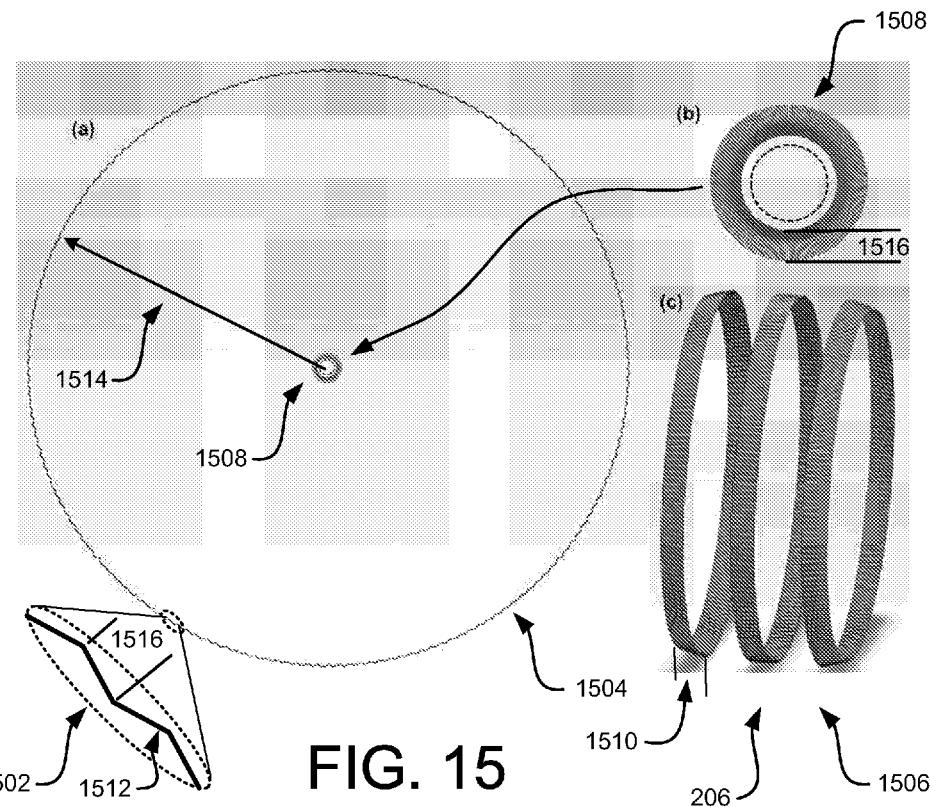
FIG. 15 illustrates an example of the pleated foil liner design.

FIGS. 15a-15c illustrate an example of the pleated foil liner design. Each of the foil liners 206 comprise pleats 1502. FIG. 15 illustrates the pleated foil liners 206, where the same foil liners 206 are reduced from the original state 1504, to an intermediate state 1506, to a collapsed state 1508. The initial angle of the pleats 1502 will be determined depending upon the designs of the particular embodiment. In an example embodiment, each of the foil liners 206 are comprised of a strip of metal arranged in a hoop, wherein the hoop is defined by a width 1510, a thickness 1512, and a radius 1514. Each pleat is defined by a pleat width 1516. Upon collapse, the pleat width defines a thickness of the collapsed metal shell when in the collapsed state 1508.

As apparent in FIGS. 15a-15c, the foil liner thickness at full compression can have a significant thickness that approximates the width 1516 of a pleat 1502. For this case, the outer radius of the foil liner, for what would be more aptly called the shell, is 2.1 cm. These dimensions assume that there is little compression of the foil liner itself, which appears justified by the small increase in the liner internal energy at peak compression noted in FIG. 14. For the reactor scale lithium liner, both the mass and the volume per unit mass will increase considerably. The shell radius for the one meter lithium foil liner would be ~5 cm. The slowing-down distance for the 14.1 MeV neutrons is on the order of 3-5 cm depending on material so that such a shell would function adequately as a blanket for the absorption of most of the fusion neutron energy if not the neutrons. The shell is certainly thick enough to absorb both the fusion alpha as well as the plasma particle energy and radiation. Having the shell as the blanket and first wall is doubly advantageous. In a standard nuclear-electric fusion system this energy flows to the reactor wall and can only be partially recovered as electricity in a thermal cycle. In the various embodiments, the shell/blanket not only shields the reactor, but provides for direct conversion of this heat energy into electrical energy if the shell is thoroughly vaporized and ionized. The use of lithium helps considerably in this regard. The first ionization energy for lithium is only 520 kJ/mole. The lithium shell is roughly 75 moles for a total energy requirement of 40 MJ for ionization. Recall that the plasma energy with the larger liner was 1.4 MJ. The fusion gain would thus need to be roughly 30 or greater, which is possible with ignition.

In an example embodiment, another way of reducing the gain requirement would be to increase the liner kinetic energy by employing a faster liner velocity. With a terminal liner speed of 4 km/sec the input energy is increased by a factor of $1.6^2$ (to 3.6 MJ) and the gain increased by a factor of 2.9 to 20 (72 MJ). This faster liner velocity alone would be more than sufficient to ionize and energize the lithium shell.

The 3D foil liner compression of the FRC plasma validates liner compression as a practical approach to achieving a small scale, low yield source of fusion energy. At a minimum, this method will facilitate the exploration and development of a new regime of fusion plasma physics that could lead to very different application and usage to that of the path now being pursued by virtually all other fusion efforts. At a gain ~1-5, there would be application to the breeding of fissile fuel, particularly for the Thorium cycle, to support the future generation of advanced fission plants. There would also be the possible application to the burning and transmuting of long-lived fission products and actinides from commercial fission.

In an example embodiment, the use of such a system for space propulsion is achievable, and represents a unique opportunity to gain the interest of a community that has the resources to rapidly develop the science and technology. How embodiments of the magnetic insulation fusion system 100 would find applicability in space propulsion applications is disclosed hereinbelow. Such embodiments may be referred to as a fusion driven rocket (FDR).

In the various embodiments for space propulsion applications, a straightforward way to convert the fusion energy into propulsive energy is provided. Providing space propulsion starts by employing an inductively driven thin metal liner first to compress the magnetized plasma. As the radial and axial compression proceeds, this liner coalesces to form a thick (r>5 cm in an example embodiment) shell that acts as a fusion blanket that absorbs virtually all the fusion energy as well as the radiated plasma energy during the brief fusion burn time. This superheated blanket material is subsequently ionized and now rapidly expands inside the divergent magnetic field of the nozzle that converts this blanket plasma energy into propulsive thrust. The electrical energy required for the driver system may be generated from the back emf experienced by a conical magnetic field coil circuit via flux compression. Power required for recharging the energy storage modules, such as the capacitors, for the metal liner driver coils could readily be obtained from conventional solar electric power. Accordingly, for the near term space missions, solar electric requires the least technology development, lowest cost and highest technology readiness level (TRL).

Figure 16:
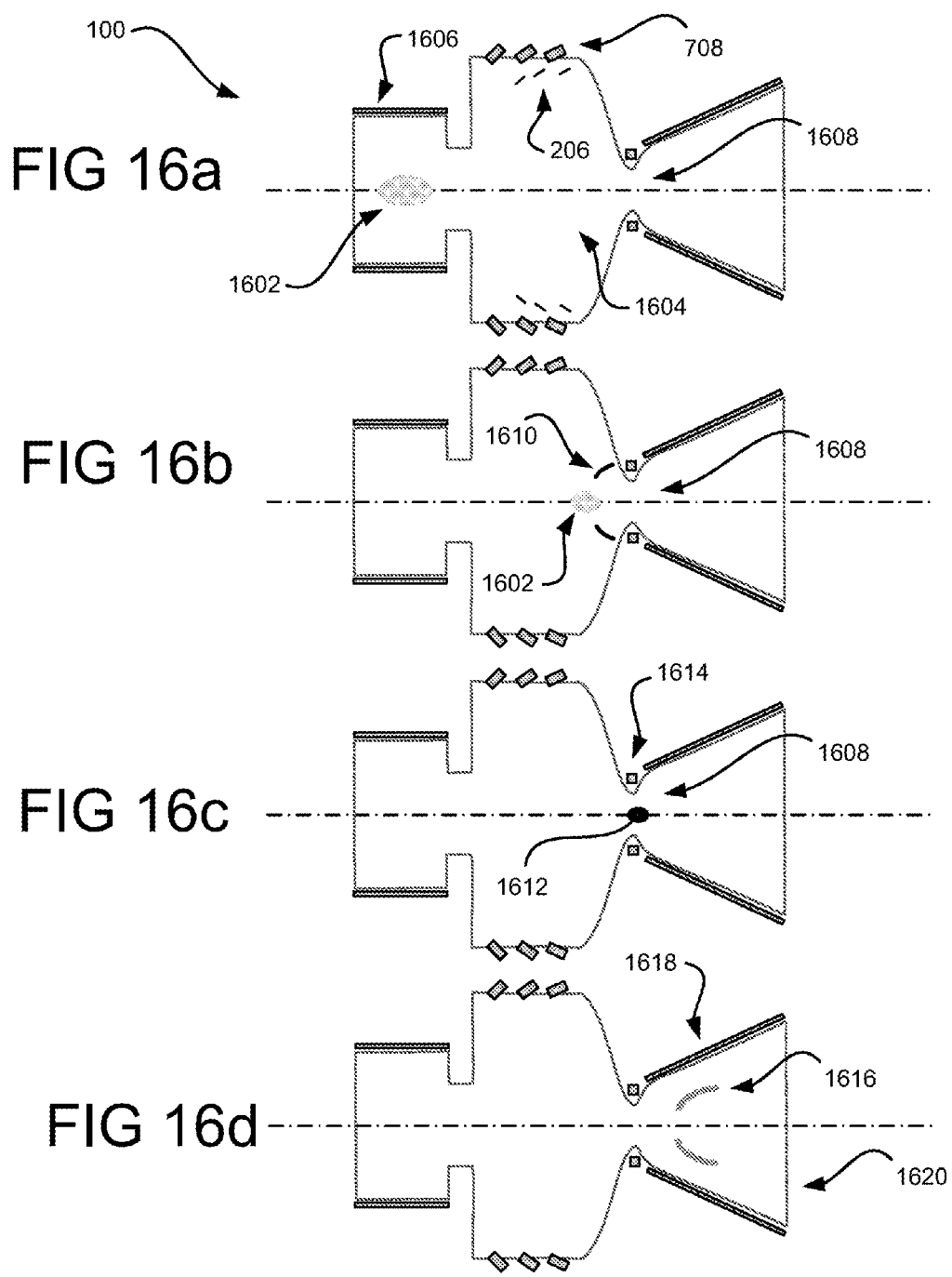
FIGS. 16a-16d are schematics of the inductively driven metal propellant compression of the FRC plasma for propulsion in an exemplary embodiment of the magnetic insulation fusion system.

FIGS. 16a-16d are schematics of the inductively driven metal propellant compression of the FRC plasma for propulsion in an exemplary embodiment of the magnetic insulation fusion system 100. FIG. 16a illustrates a plurality of foil liners 206, or thin hoops of metal. The target FRC plasma 1602 is created in the plasma containment chamber, and is then injected into thruster chamber 1604, interchangeably referred to as a fusion containment chamber, by magnetic fields established by the energized driver coils 1606. The foil liners 206 are driven at the proper angle and speed for convergence, using driver coils 708, onto the target FRC plasma (at the thruster throat 1608).

FIG. 16b illustrates that the target FRC plasma 1602 is confined by axial magnetic field from shell driver coils 708 as it translates through chamber 1604, eventually stagnating at the thruster throat 1608. Thus, the collapsing foil liners 206, which may be pleated, converge with the target FRC plasma 1602 as it moves towards the thruster throat 1608.

FIG. 16c illustrates that the converging shell segments 1610 (formed from the compressed foil liners 206) form a fusion blanket 1612, thereby compressing the target FRC plasma to a fusion conditions. Additional driver coils 1614 may be used to contain the fusion blanket 1608 at the thruster throat 1608.

FIG. 16d illustrates a vaporized and ionized plasma blanket 1616 comprising fusion neutrons and alphas. The plasma blanket 1616 expands against the divergent magnetic field established by driver coils 1618 resulting in the direct generation of electricity from the back emf, and a directed flow of the metal plasma out of the magnetic nozzle 1620. The expanding metal plasma blanket 1616 exiting the magnetic nozzle 1620 generates thrust.

A very persuasive reason for investigating the applicability of nuclear power in rockets is the vast energy density gain of nuclear fuel when compared to chemical combustion energy. The conventional application of a reactor based fusion-electric system however would create a colossal mass and heat rejection problem for space application. Embodiments of the magnetic insulation fusion system 100 provide a practical path to fusion propulsion by creating fusion under conditions that work in the context of space. Here, a fusion propulsion system embodiment provides for the resultant fusion energy to be directly converted into electrical and propulsive (directed) energy, while not being so massive or complex as to require hundreds of ETO launches, large scale assembly, and/or maintenance in space. It is believed that the various embodiments could be adapted to satisfy these criteria in a manner that can be developed in the near term at low cost, and require no significant technological advances to achieve a working system for space use. In an example embodiment, a method that utilizes the ionized lithium shell to not only achieve fusion conditions, but to serve as the propellant as well, is used in space applications. As in the reactor concept, an array of low-mass, magnetically-driven lithium metal liners are inductively driven to converge radially and axially to form a thick blanket surrounding the target FRC plasma and compress the FRC plasma to fusion conditions. Unlike the earth based reactor, the liner motion is made asymmetrical with a significant axial velocity component.

Virtually all of the radiant, neutron and particle energy from the target FRC plasma is absorbed by the encapsulating, thick metal blanket (collapsed foil liners 206), thereby isolating the spacecraft from the fusion process and eliminating the need for a large radiator mass. This energy, in addition to the intense Ohmic heating at peak magnetic field compression, is adequate to vaporize and ionize the metal blanket. The expansion of this hot, ionized metal propellant through the magnetic nozzle 1620 is used to directly generate electrical power from the back EMF, as well as produce high thrust at the optimal exhaust velocity. The energy from the fusion process, along with the waste heat, is thus utilized at very high efficiency permitting a low-gain fusion propulsion system to be realized at significantly lower mass and input energy.

The various space propulsion applications embodiments allow for a fairly straightforward way to recover the small fraction of electrical energy required for operation (~1-2%). This is due to the pulsed nature of the fusion energy generation along with the magnetic insulation that is naturally provided by the magnetic fields used to drive the compression of the lithium liners. The rapid thermal expansion of the FRC plasma caused by the fusion pulse is buffered by the established magnetic barrier. (The divergent geometry of this magnetic field also redirects this expansion into an axial flow.) By employing a conducting boundary to constrain this barrier field flux, a voltage is induced due to the radial compression of the flux swept out by the expanding plasma. The back emf experienced by these conductors can then be tapped to recharge the driver capacitors.

In the various embodiments supporting spaced-based fusion, spacecraft applications demand a much lower system mass. The lowest mass system by which fusion can be achieved is based on the very compact, high energy density regime of magnetized fusion employing a compact toroidal FRC. It is of paramount advantage to employ a closed field line plasma that has intrinsically high β (plasma/magnetic pressure ratio), and that can be readily translated and compressed, for the primary target plasma for MIF. Of all fusion reactor embodiments, the FRC plasmoid has the linear geometry, and sufficient closed field confinement required for MIF fusion at high energy density. Most importantly, the FRC plasma provides both translatability over large distances as well as the confinement scaling, with size and density required to assure sufficient lifetime to survive the compression timescale required for liner-based inertial fusion. FRC plasmoids have also been formed with enough internal flux to easily satisfy the B·R ignition criteria at peak compression.

Figure 17:
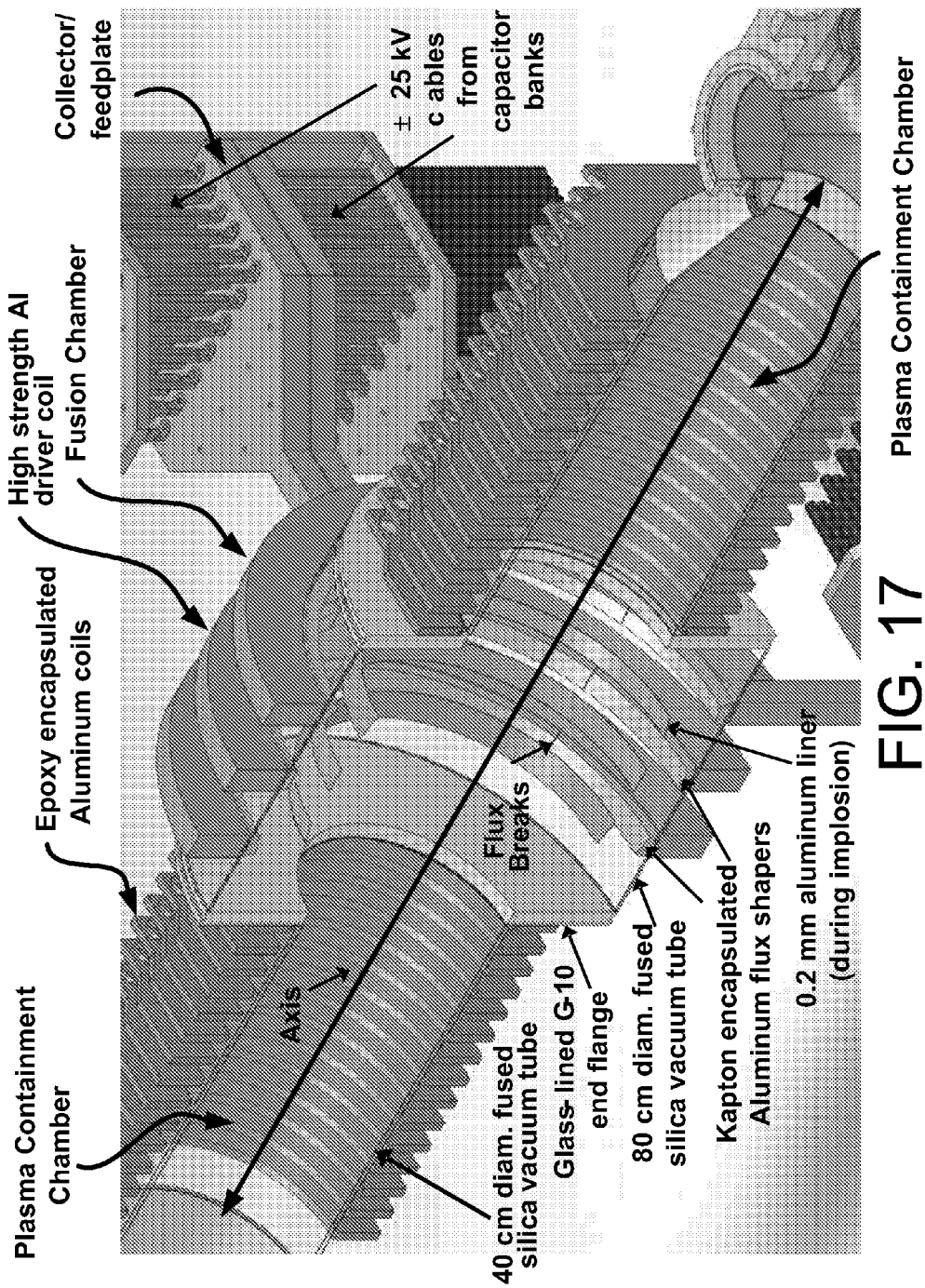
FIG. 17 is perspective cut-away view of an embodiment of the magnetic insulation fusion system.

FIG. 17 is a perspective cut-away view of an embodiment of the magnetic insulation fusion system 100 aligned along a longitudinal axis. During shell compression and fusion, the FRC plasma is aligned along the system axis. In an example embodiment, capacitor banks are upgraded fully to the low inductance pseudo-spark switches which provide for much lower jitter as well as greater reliability. Such embodiments will assure that all three foil liners 206 merge properly. Current ignitron crowbar switches will also be employed. In an example embodiment, the three cable collectors, feed plates and driver coils need to be fabricated. The coils may be cut from 7075 Aluminum plate. Supporting struts between coils (not shown in FIG. 17) may also be built to take up the axial magnetic loads. A calculation for a 10 cm thick coil subjected to a transient 8 T field of the waveform expected for the field pressures was carried out. The main deformation exhibited in the calculations was an oscillatory radial motion with a mean deflection of less than 400 microns in the coil radius. This ringing imposes no limitation on the coil lifetime. In an example embodiment, the fused silica tubes will be sent out, cut and finished for the main compression chamber.

In an example embodiment, 0.2 mm thick aluminum liners will be employed. The pleated liner may be manufactured in a variety of manners. For example, but not limited to, the foil liners 206 may be formed as a roll up with a seam weld, with the extra material optionally removed by grinding, sanding or the like. This procedure should lend itself easily to incorporating pleats as the pleats could be made prior to welding.

The magnetic insulation fusion system 100 is electrodeless so that the magnetized FRC plasma is magnetically isolated. Accordingly, thermal and chemical wall interactions are negligible. Since the FRC plasma is magnetically confined, high-temperature energetic particles remain isolated from the thruster walls, considerably increasing lifetime of the magnetic insulation fusion system 100 and minimizing wall conduction losses. This isolation of the magnetized FRC plasma also allows for efficient operation at high specific impulse, and allows operation with chemically reactive gases that contain oxygen or complex molecules such as monopropellants, in-situ resources, and/or ambient resources.

Embodiments of the magnetic insulation fusion system 100 provide a pulsed and highly efficient ionization source that is variable over a vast range of power, thrust, and Isp levels. The input propellant mass, preferably a gas, which is used to form the FRC plasma is completely isolated from the driving field so no complex magnetic detachment is required. A large azimuthal current (up to 20 kA) is generated with a radio frequency (RF) wave in the form of a steady transverse rotating magnetic field. The large azimuthal current is driven by rotating magnetic fields, rather than induced currents. The RF frequency is typically well under 1 MHz so that voltage and switching requirements can be met by modern solid-state switching. The axial forces are primarily driven by the driven $J_\theta$ and applied $B_r$ rather than thermal forces.

The inductive field reversed configuration employed by the various embodiments of the magnetic insulation fusion system 100 is now described. A field reversed plasma (FRC plasma) is simply a plasma that has large internal flowing currents. Those currents are large enough that they can generate magnetic fields that cancel out any applied magnetic field. This effect can best be demonstrated in a planar geometry.

Figure 18:
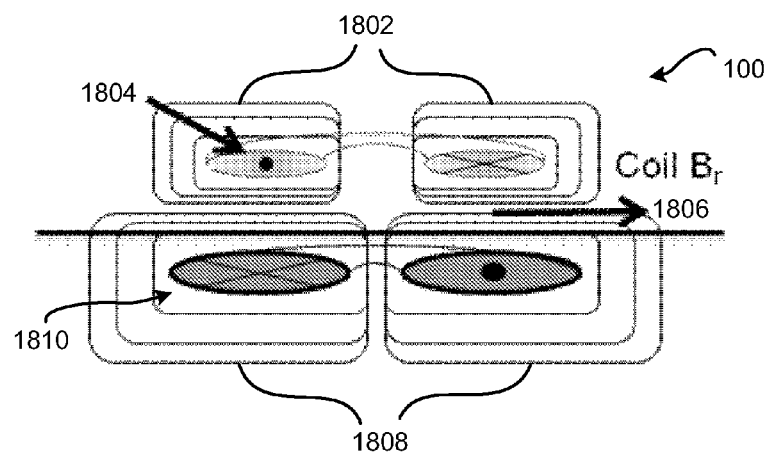
FIG. 18 shows a planar 'pancake' inductive coil that has a net, changing azimuthal current.

FIG. 18 shows a planar 'pancake' inductive coil 1802 that has a net, changing azimuthal current 1804. That current 1804 induces an azimuthal electric field 1806 which ionizes and induces a current 1808 in a neutral gas 1810. Equation (19) shows a simplified ohms law for azimuthal components.

$$\frac{-dB}{dt} = E_\theta = \eta j_\theta \quad (19)$$

In Equation (19), dB is the magnitude of the magnetic field in the direction of the system axis, $E_\theta$ is the induced electric field in the azimuthal direction, η is the plasma bulk electrical resistivity, and $j_\theta$ is the azimuthal current density in the plasma.

When the azimuthal current generates a magnetic field large enough to oppose the coil field, it is called "reversed." This simply means that the applied field can no longer penetrate through the plasma magnetic field and into the plasma. It is important to note, that in this case there is a very strong magnetic pressure on the plasma current ring, from $J_\theta \times B_r$. In a cylindrical geometry, the above plasma is described simply as the Field Reversed Configuration (FRC).

Figure 19:
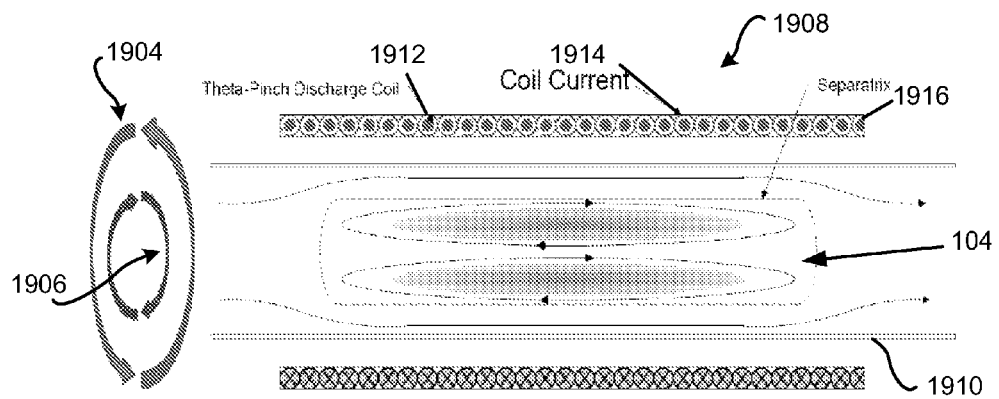
FIG. 19 is a schematic of an exemplary FRC device.

FIG. 19 is a schematic of an exemplary FRC device. In this case, a current ring 1904 generates a force that is primarily directed radially inward from both sides of the FRC plasma 104, thus compressing the FRC plasma 104. An FRC has another specific distinction from a simple current ring described so far. An initial magnetic field (in the opposite direction) fills the chamber before a discharge. A current ring 1906 forms and begins imploding the initial magnetic field (and particularly the trapped flux), and prevents the current ring 1904 from collapsing completely. This effect enhances coupling, maximizes trapped magnetic field, and dramatically increases the stability of the plasma.

As conceptually illustrated in FIG. 19, magnetized FRC plasma 104, also referred to herein as a Field Reversed Configuration (FRC) plasmoid 104, consists of a closed field line, fully ionized plasma confined by a large azimuthal self current. This plasma diamagnetic current flows opposite to the coil currents producing the external axial magnetic field. In an example embodiment, magnetized FRC plasma 104 is formed in a cylindrical coil 1908 with a fast (<10 μs), and large (100's kA) pulsed inductive discharge resulting in a stable, well-confined plasmoid that is neutral to translation. For a thruster system, a simple conical coil 1908 can then be employed to produce the magnetic gradient desired for rapid ejection of the magnetized FRC plasma 104. In the thruster application embodiment, the steeper the coil pitch (field gradient) and the shorter the length of the cone, the faster and more rapid will be the magnetized FRC plasma 104 acceleration and ejection. Typically this demands a very rapid and large flux change in order to generate a sufficiently large induced current. This method thus inherently requires a high voltage pulse power system for operation. As an aside, it can be noted that the pulsed inductive thruster can be thought of in this way as the limit where the cone angle reaches 90°. Fortuitously, there is another method for the generation of the magnetized plasma 120 that does not rely on high voltage inductive techniques. The same azimuthal currents can be caused to arise without the rapid magnetic flux change of pulsed induction by employing a Rotating Magnetic Field (RMF) where the rotating field lines lie in a plane transverse to the axis −122 in a cylindrical geometry.

In the various embodiments, when the internal fields balance the external fields, several very advantageous physical phenomena occur. First, the internal FRC plasma 104 becomes completely detached from the external field. This allows the FRC plasma 104 to either be worked on or translated by the coil 1908 and limits any plasma interaction with the walls 1910. Further, complex magnetic detachment of the magnetized propellant is not required. The non-limiting exemplary coil 1908 is illustrated as having a theta-pinch portion 1912, a coil current portion 1914, and a separatrix portion 1916. Other embodiments may have more than, or fewer than, the exemplary coil portions 1912, 1914, 1916, and/or may use other nomenclature to identify the various portions of the coil 1908.

Embodiments of the magnetic insulation fusion system 100 allow for a magnetic pressure balance to occur, where the magnetized radial plasma pressure balances the external applied magnetic field, as described in Equation (20), where $B_{ext}$ is the axial magnetic field external to the FRC radially, n is the plasma density, k is the Boltzmann constant, $\mu_0$ is the free space permeability constant, and T is the total plasma temperature.

$$P_0 = nkT = \frac{B_{ext}^2}{2\mu_0} \qquad (20)$$

During operation, embodiments of the magnetic insulation fusion system 100 realize an additional unexpected significant advantage. As illustrated in the idealized magnetic fields in FIG. 19, the magnetic field is compressed between the conducting plasma and the conducting coil. This will further drive the FRC plasma 104 from the walls 1910 and act to amplify the effective magnetic fields.

Embodiments of the magnetic insulation fusion system 100 facilitate stability, radial, and axial pressure balances that become key parameters to design an FRC system. For propulsion application embodiments, design parameters may be based on the last stage of the FRC formation process, referred to herein as translation. In a highly-compressed configuration, a FRC plasma 104 will begin to translate out of the discharge portion of coil 1908 with a small non-uniform field or neutral density. This is typically accomplished with a small conical angle to the discharge portion of coil 1908 providing a small J×B force on the FRC plasma 104. However, as the FRC begins to leave the discharge portion of coil 1908, it is acted upon by a strong magnetic pressure gradient that drives the FRC axially. This force is given in Equations (21) and (22), where $m_d$ is the magnetic moment of the plasma body.

$$F = Ma = \nabla(m_d \cdot B) \qquad (21)$$

$$F_Z = m_d \frac{dB}{dz} \qquad (22)$$

Figure 20:
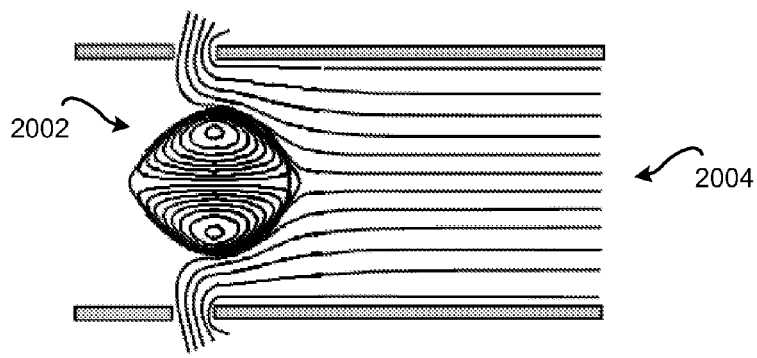
FIG. 20 illustrates an example FRC plasma in a diverging magnetic field.

FIG. 20 illustrates an example FRC plasma 2002 in a diverging magnetic field 2004. A greater detailed appreciation of the process can be realized by assuming a specific model for FRC shape, but it is also consistent with an energy argument for a high-β plasma. Equations (23) and (24) show a non-limiting predictive energy equation that does not require a priori knowledge of the FRC shape, rather its initial and final temperature conditions. These equations are based simply on the expansion of a high-β plasma from one temperature state to another assuming that the only net velocity (and therefore kinetic energy) is an axial one. N is the total particle inventory, $E_{BV}$ is the initial vacuum magnetic field energy, $V_z$ is the axial velocity, and $T_0$ is the final temperature.

$$E_{Tot} = 5/2NkT + E_{BV} + 1/2NM_0V_z^2 \qquad (23)$$

$$1/2MV^2 = 5/2Nk(T-T_0) \qquad (24)$$

For propulsion application embodiments, issues of the various embodiments of the rotating magnetic insulation fusion system 100 are now described in greater detail. First, the nature of a high-density, magnetized discharge lends itself to higher thrust, power, and plasma densities resulting in smaller thruster footprints and possibly smaller dry mass than a comparable-power electrostatic device. The inductive nature of the discharge provides an electrodeless environment that does not require neutralizer or life-limiting cathode and anode surfaces. Unlike legacy EP pulsed electromagnetic devices, the FRC plasma generated by embodiments of the magnetic insulation fusion system 100 do not have plasma attached to the spacecraft (through coil field lines), and will have minimal divergence and spacecraft interaction issues. The pulsed and high electron temperature nature of the discharges immediately enables lower ionization losses due to excitation and recombination reactions. Also, the isolation of a compressed flux boundary limits wall-transport/interaction, decreasing ionization losses and enabling operation on complex and chemically-reactive propellants.

Figure 21:
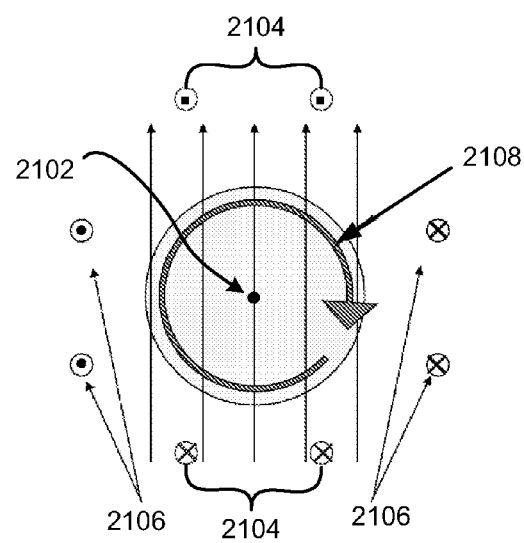
FIG. 21 illustrates formation of a rotating magnetic field.

FIG. 21 illustrates formation of a rotating magnetic field, also referred to as a composite magnetic field, that appears to be rotating perpendicular to an axis 2102. In an exemplary embodiment, a Helmholtz coil pair 2104 generates a uniform magnetic field perpendicular to the coil axis (transverse) as shown in black. A second, perpendicular coil pair 2106 will also drive a transverse magnetic field, only perpendicular to the original pair (blue). If the two coils 2104, 2106 are driven with oscillating signals at substantially the same frequency, but out of phase, the composite magnetic field will be a rotating, transverse magnetic field. An exemplary embodiment employs oscilating sinusiodal signals that are 90° out of phase, though any suitable out of phase angle may be used. If an electron is magnetized to those field lines, it will be dragged and rotate azimuthally at the same frequency as the antennas. If the magnitude of $J_\theta$ is sufficient that an initial, axial bias is reversed, then the magnetized plasma 120 is formed. For an axially-distributed RMF system it is found that the azimuthal current may be described in accordance with Equation (25).

$$J_\theta = en_e \omega r \quad (25)$$

The large $J_\theta$ may be driven in a conical field with a radial magnetic field in a thruster system. The fully-reversed magnetized FRC plasma 104 is then accelerated axially by the resultant $J_\theta \times B_r$ force. If the RMF antenna is also extended in the conical section, the azimuthal current continues to be generated as the magnetized FRC plasma 104 moves downstream and the magnetized FRC plasma 104 accelerates throughout the entire cone in thruster embodiments. Finally, in thruster embodiments, as the magnetized FRC plasma 104 expands through the conical section and beyond the exit of the cone the thermal energy of the magnetized FRC plasma 104 is converted into axial velocity.

The magnetized FRC plasma 104 formation is now described in greater detail. Magnetized FRC plasma 104 formation utilizes a more advanced formation scheme to ionize and reverse a propellant. In an exemplary embodiment, the illustrated two Helmholtz-pair magnetic field coils 2104, 2106 form the antennas. Current in each antenna 2104, 2106 is varied sinusoidally to produce a transverse magnetic field which rotates in the r-θ plane, and which may be characterized in the form of Equation (26).

$$B_{RMF} = B_w \cos(wt)\hat{e}_r + B_w \sin(wt)e_\theta \quad (26)$$

This creates a composite magnetic field 2102 that appears to be rotating perpendicular to the axis, as illustrated in FIG. 21. The rotating magnetic field (RMF) antennas 2104, 2106 may be applied as a cylindrical tube to create an axial uniform, rotating magnetic field. An example embodiment employs two RMF saddle antennas constructed of copper Litz wire. Total antenna resistance may be less than 0.1 mΩ in an exemplary embodiment. The four flux conserving coils may be constructed of a single turn of 2 cm wide, 1.5 mm thick rectangular Litz in an exemplary embodiment. A multi-turn solenoidal winding provides for the bias field of 50-100 G, and is activated for each plasmoid pulse, with sufficient time to penetrate the Litz flux preserving/conserving straps. The RMF antenna fields are produced by activating a simple closing switch allowing a high-efficiency pulsed capacitor to discharge and establish an oscillator/oscillation that is subsequently heavily damped by plasma load.

When an electron is magnetized, the magnetized electron is rotated with the field and forms a rotating $J_\theta$ current. The frequency of rotation is between the ion and electron cyclotron frequencies, $\Omega i < \omega < \Omega e$. Thus the electrons can be thought of as tied to the RMF field, and having the effect of driving the electrons in the direction of the RMF rotation while leaving the ions unaffected. As this electron rotates, it ionizes other particles creating a bulk, high energy current that is rotating azimuthally along the system axis.

As this magnetized FRC plasma 104 drags bulk electrons azimuthally, a large current (on the order of tens of kA) is formed near the quartz boundary. If the generated current is more than the applied bias, a fully reversed configuration is formed. This then has a similar geometry to the inductively formed FRC described above, although it was not created with large pulsed currents, but rather RF oscillating currents and is dominated by the Hall term.

Figure 22:
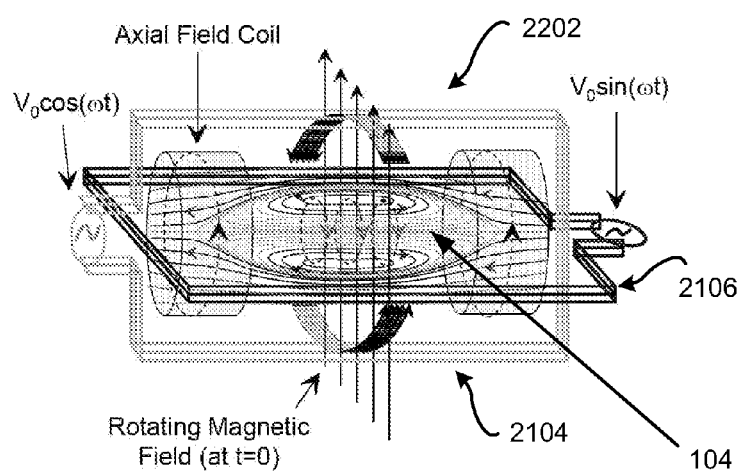
FIG. 22 is a perspective conceptual view of the resultant RMF field.

FIG. 22 is a perspective conceptual view of the resultant RMF field 2202. In the case of the inductive plasmoid formation above, the internal currents are a complex function of plasma resistivity and coupling and are typically significantly less than the driving current. In plasmoid formation, ionization is typically 100% and drive current can be described simply as Equation (27).

$$J_\theta = en_e \omega r \quad (27)$$

Depending upon the embodiment and operation thereof, $J_\theta$ can be many times the magnitude of oscillating current.

In the various embodiments, three significant requirements are met with a fully reversed magnetized FRC plasma 104. First, the induced Hall term, $J \times B/n_e$, must be sufficient to fully reverse the applied bias field. Second, RMF must penetrate the plasma, which sets an upper limit on plasma density, typically ~$10^{19}$ m$^{-3}$. And third, the electrons must be magnetized and free to rotate, but the ions must remain fixed ($\phi_{ce} > v_{ei}$).

An exemplary plasmoid formation may proceed as follows. a) A set of solenoidal windings create an axial bias magnetic field inside array of isolated conducting bands which preserve magnetic flux but permit transverse fields from RF antennas. Neutral gas fills the chamber. b) An RF antenna produces oscillating transverse m=1 mode where electrons couple to the component rotating in the electron drift direction. A high density plasma of moderate pressure peaked on axis is produced. c) Newly created plasma electrons are strongly magnetized to RF field, and with the continuously increasing plasma density result in an ever larger synchronous electron motion (azimuthal current). Ohmic power flow dramatically increases plasma energy density (pressure). The high β plasma (diamagnetic) current opposes the initial axial magnetic flux. The flux conserving bands prohibit the initial coil flux from escaping thereby causing a large increase in the magnetic field external to the plasma as this field is compressed between the plasma and metal bands. (Lenz's law dictates that the plasma current be mirrored in the flux conserving bands thus enhancing the magnetic field even more). d) The magnitude of synchronous electron motion (i.e. current) driven by the rotating magnetic field reduces the magnitude of the axial magnetic field progressively inward radially toward the system axis.

When sufficient synchronous current is attained, a point is reached where the axial magnetic field direction is reversed on the system axis to the field external to the plasma. At this point in time, the plasma becomes wholly confined by the magnetic field produced by these plasma currents, and magnetically isolated from the magnetic field produced by the currents in the external coils and flux conserving bands. The result is a well confined, closed field plasmoid (FRC) in equilibrium with an external field now many times larger than the initial bias field, and a stable, fully formed magnetized plasma persists in the discharge region for as long as the RMF is maintained.

It should be emphasized that the above-described embodiments of the magnetic insulation fusion system 100 are merely possible examples of implementations of the invention. Many variations and modifications may be made to the above-described embodiments. All such modifications and variations are intended to be included herein within the scope of this disclosure and protected by the following claims.

The invention claimed is:

1. A magnetic insulation fusion system, comprising:
   a fusion containment chamber;
   a metal shell that initially resides about an outer periphery of an interior region of the fusion containment chamber;
   a driver coil disposed around an outside of the fusion containment chamber;
   a plurality of foil liners arranged as adjacent hoops disposed about the outer periphery of the interior region of the fusion containment chamber, wherein the plurality of foil liners are pleated with a plurality of pleats defined by a pleat width; and
   an established Field Reversed Configuration (FRC) plasma, wherein the FRC plasma is a closed field, magnetically confined plasma,
   wherein upon energization of the driver coil, a generated magnetic field inductively collapses the metal shell about the FRC plasma to compress the FRC plasma to fusion conditions.

2. The magnetic insulation fusion system of claim 1, further comprising:
   a capacitor bank configured to energize the driver coil.

3. The magnetic insulation fusion system of claim 1, wherein the fusion containment chamber comprises:
   a fused silica tube.

4. The magnetic insulation fusion system of claim 1, further comprising:
   a magnetic nozzle configured to receive metal plasma comprising the metal shell and the FRC plasma after fusion, wherein the magnetic nozzle directs flow of the metal plasma out of the magnetic nozzle to generate thrust.

5. The magnetic insulation fusion system of claim 1, wherein the plurality of foil liners are made of aluminum.

6. The magnetic insulation fusion system of claim 1, wherein the pleat width defines a thickness of the collapsed metal shell.

7. The magnetic insulation fusion system of claim 1, wherein the driver coil is a first driver coil, wherein the FRC plasma is a first FRC plasma, and further comprising:
   a first plasma containment chamber adjacent to a first opening of the fusion containment chamber;
   a plurality of second driver coils disposed around an outside of the first plasma containment chamber, wherein the first FRC plasma is established in the first plasma containment chamber when the plurality of second driver coils are energized, and wherein the first FRC plasma is moved from the first plasma containment chamber into a central region of the fusion containment chamber via the first opening to the fusion containment chamber;
   a second plasma containment chamber adjacent to a second opening of the fusion containment chamber; and
   a plurality of third driver coils disposed around an outside of the second plasma containment chamber, wherein a second FRC plasma is established in the second plasma containment chamber when the plurality of third driver coils are energized, and wherein the second FRC plasma is moved from the second plasma containment chamber into the central region of the fusion containment chamber via the second opening to the fusion containment chamber,
   wherein the first FRC plasma and the second FRC plasma are merged into a merged FRC plasma, and
   wherein the metal shell is collapsed about the merged FRC plasma to establish a fusion reaction using the merged FRC plasma.

8. The magnetic insulation fusion system of claim 1, wherein the driver coil is a first driver coil, and further comprising:
   a plasma containment chamber adjacent to the fusion containment chamber; and
   a plurality of second driver coils disposed around an outside of the plasma containment chamber,
   wherein the FRC plasma is established in the plasma containment chamber when the plurality of second driver coils are energized, and wherein the FRC plasma is moved from the plasma containment chamber into a central region of the fusion containment chamber.

9. The magnetic insulation fusion system of claim 8, further comprising:
   a first plurality of magnetic field coils disposed around an outside of the plasma containment chamber, wherein the first plurality of magnetic field coils are configured to receive a first oscillating current that produces a first transverse magnetic field with respect to a system axis of a plasma propulsion system;
   a second plurality of magnetic field coils around the outside of the plasma containment chamber and oriented orthogonally to the first plurality of magnetic field coils, and configured to receive a second oscillating current that produces a second transverse magnetic field, wherein the second oscillating current is out of phase with the first oscillating current;
   a plurality of electrical conductors oriented along the system axis, wherein the plurality of electrical conductors form a closed conducting path in a plane orthogonal to the system axis; and
   a plurality of magnetic elements oriented along the system axis that produce a magnetic field aligned with the system axis,
   wherein the FRC plasma is moved out of the plasma containment chamber into the fusion containment chamber.

* * * * *